United States Patent
Adolphe

(10) Patent No.: US 12,255,995 B2
(45) Date of Patent: Mar. 18, 2025

(54) ENCRYPTION RETRANSMISSION DEVICE FOR PROVIDING RESILIENCY AGAINST ATTACKS

(71) Applicant: Forward Edge-AI, Inc., San Antonio, TX (US)

(72) Inventor: Eric Adolphe, San Antonio, TX (US)

(73) Assignee: Forward Edge-AI, Inc., San Antonio, TX (US)

( * ) Notice: Subject to any disclaimer, the term of this patent is extended or adjusted under 35 U.S.C. 154(b) by 203 days.

(21) Appl. No.: 18/309,323

(22) Filed: Apr. 28, 2023

(65) Prior Publication Data

US 2024/0364507 A1 Oct. 31, 2024

(51) Int. Cl.
*H04L 9/08* (2006.01)
*H04L 9/40* (2022.01)

(52) U.S. Cl.
CPC .......... *H04L 9/088* (2013.01); *H04L 63/1441* (2013.01)

(58) Field of Classification Search
CPC ............................ H04L 9/088; H04L 63/1441
See application file for complete search history.

(56) References Cited

U.S. PATENT DOCUMENTS

| 6,253,321 | B1* | 6/2001 | Nikander | H04L 63/164 |
| | | | | 713/168 |
| 11,588,798 | B1* | 2/2023 | Cline | H04L 63/0272 |
| 12,088,569 | B1* | 9/2024 | Cline | H04L 45/74 |
| 2012/0201383 | A1* | 8/2012 | Matsuo | H04L 9/12 |
| | | | | 380/255 |

* cited by examiner

*Primary Examiner* — Han Yang

(57) ABSTRACT

An encryption retransmission device for providing resiliency against attacks. The encryption retransmission device includes an encryption unit, a communication unit, and a galvanic isolator. The encryption unit encrypts an egressing native packet and adds a connectionless header forms an egressing connectionless datagram, and decrypts an encrypted ingressing native packet of an ingressing connectionless datagram. The communication unit communicatively couples with the encryption unit, adds a complex header to the egressing connectionless datagram for forming an egressing packet for delivery to the first encryption retransmission device, receives an ingressing packet comprising the encrypted ingressing native packet and a complex header from the first encryption retransmission device, removes the complex header and adds a connectionless header for forming the ingressing connectionless datagram. The galvanic isolator electromagnetically couples with the encryption unit and the communication unit and galvanically isolates the encryption unit and the communication unit.

20 Claims, 32 Drawing Sheets

ENCRYPTION RETRANSMISSION DEVICE FOR PROVIDING RESILIENCY AGAINST ATTACKS

GOVERNMENT INTEREST

This invention was made with Government support under the Small Business Innovation Research (SBIR) Funding Agreement Number FA864923P0146 awarded by the U.S. Air Force Research Laboratory, AFWERX. The Government has certain rights in this invention.

FIELD OF THE INVENTION

Generally, the present disclosure relates to the field of data processing. More specifically, the present disclosure relates to an encryption retransmission device for providing resiliency against attacks.

BACKGROUND OF THE INVENTION

Existing techniques for facilitating communications are deficient with regard to several aspects. For instance, current techniques facilitate communication that is prone to Hammer attacks where the attacker may exfiltrate data from a device used for communicating by tapping into the powerlines associated with the device. As a result, different techniques are needed to prevent the device from a Hammer attack. Furthermore, current techniques facilitate communication that is prone to BitWhisper attacks where the attacker may exfiltrate data from a device used for communicating by capturing heat emitted by the device. As a result, different techniques are needed to prevent the device from BitWhisper attacks. Moreover, current technologies facilitate communication that is prone to an attack where the attacker may exfiltrate data from a device used for communicating by capturing radio signals emitted by the device.

Therefore, there is a need for improved an encryption retransmission device for providing resiliency against attacks that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an encryption retransmission device for providing resiliency against attacks, in accordance with some embodiments. Accordingly, the encryption retransmission device comprises at least one encryption unit, at least one communication unit, and at least one galvanic isolator. Further, the at least one encryption unit may be configured for encrypting an egressing native packet received from at least one device using at least one encryption key to create an encrypted egressing native packet. Further, the at least one encryption unit may be configured for adding a connectionless header to the encrypted egressing native packet to form an egressing connectionless datagram. Further, the at least one encryption unit may be configured for receiving an ingressing connectionless datagram comprising an ingressing encrypted native packet. Further, the at least one encryption unit may be configured for decrypting the encrypted ingressing native packet using the at least one encryption key. Further, the at least one communication unit may be communicatively coupled with the at least one encryption unit. Further, the at least one communication unit may be paired with at least one first communication unit of at least one first encryption retransmission device. Further, the at least one communication unit may be configured for receiving the egressing connectionless datagram. Further, the at least one communication unit may be configured for adding a complex header to the egressing connectionless datagram for forming an egressing packet for delivery to the at least one first encryption retransmission device. Further, the at least one communication unit may be configured for receiving an ingressing packet comprising the encrypted ingressing native packet and a complex header from the at least one first encryption retransmission device. Further, the at least one communication unit may be configured for removing the complex header from the ingressing packet. Further, the at least one communication unit may be configured for adding a connectionless header to the ingressing packet for forming an ingressing connectionless datagram. Further, the ingressing connectionless datagram may include the encrypted ingressing native packet. Further, the at least one galvanic isolator electromagnetically coupled with the at least one encryption unit and the at least one communication unit.

Further, the at least one galvanic isolator may be configured for galvanically isolating the at least one encryption unit and the at least one communication unit.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTIONS OF THE INVENTION

Figure 1:
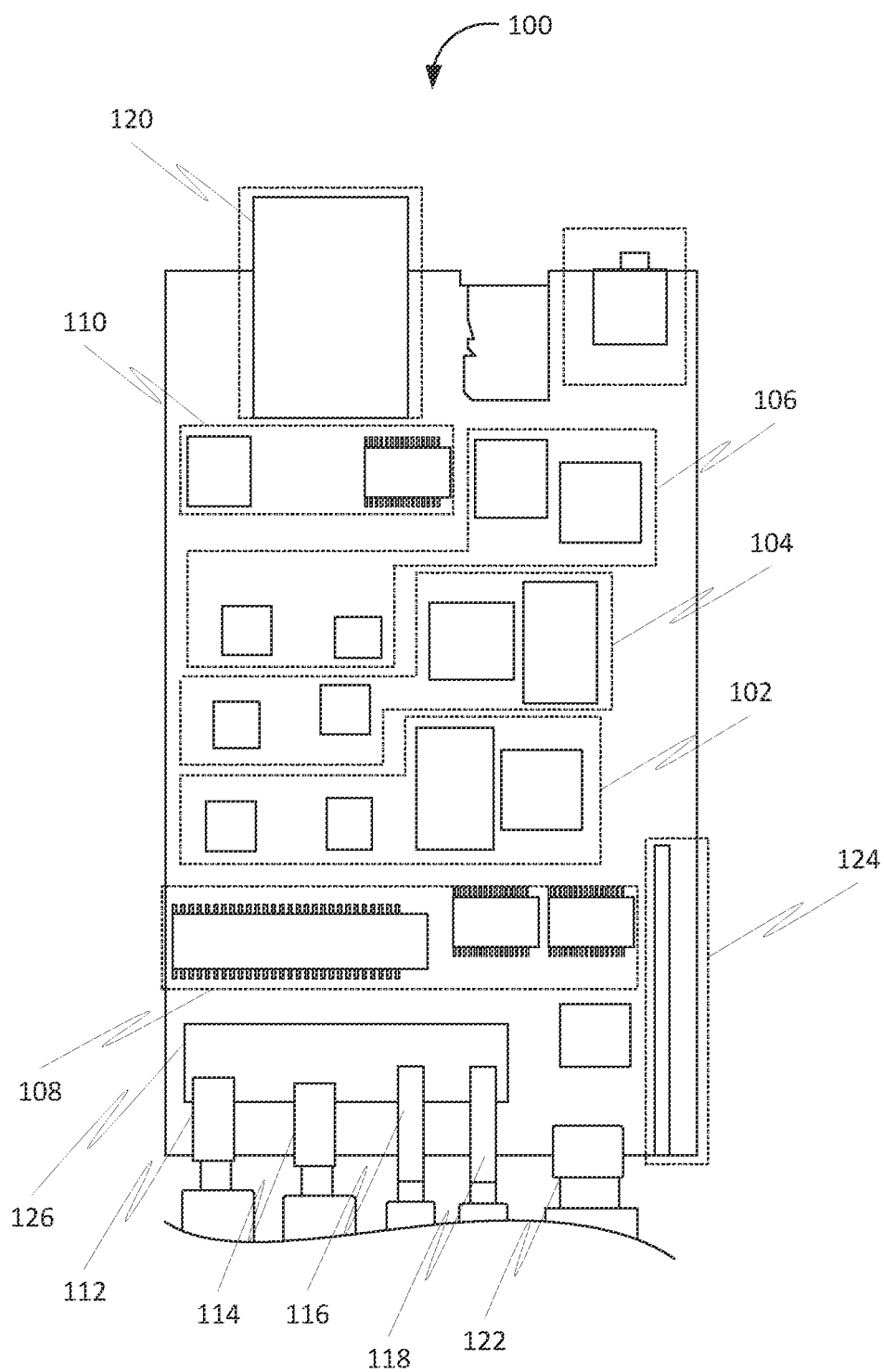
FIG. 1 is a front schematic diagram of an encryption retransmission device 100 for providing resiliency against attacks, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issued here. The present disclosure contains headers. It should be understood that these headers are used as references and are not to be construed as limiting upon the subject matter disclosed under the header.

The present disclosure includes many aspects and features. Moreover, while many aspects and features relate to, and are described in the context of an encryption retransmission device for providing resiliency against attacks, embodiments of the present disclosure are not limited to use only in this context.

In general, the method disclosed herein may be performed by one or more computing devices. For example, in some embodiments, the method may be performed by a server computer in communication with one or more client devices over a communication network such as the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device (encryption unit) configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device (communication unit) configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role-based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, and a representative thereof. Further, the user as defined herein may refer to a human, an individual, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, associated with a device corresponding to the performance of the one or more steps, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes an encryption retransmission device for providing resiliency against attacks. Further, the encryption retransmission device may implement a protocol free encryption device (PFED) (U.S. patent application Ser. No. 17/200,468, entitled "PROTOCOL FREE ENCRYPTING DEVICE," filed Mar. 12, 2021; incorporated herein by reference). Further, the encryption retransmission device may include galvanic isolation to isolate data and power pins between EU1/EU2 (encryption unit 1/encryption unit 2) and the CUI (communication unit) of the encryption retransmission device to protect against attacks such as PowerHammer. Further, the encryption retransmission device may include a network interface module (NIM) that on-boards all communication interfaces onto a PCB (printed circuit board) comprising the EU1/EU2 and CUI, connecting through the CUI to maintain a protocol break (see, U.S. patent application Ser. No. 17/200,468, entitled "PROTOCOL FREE ENCRYPTING DEVICE," filed Mar. 12, 2021; incorporated herein by reference), thus allowing for wireless communications. Further, the PCB is encased in resin to prevent tampering and protect against BitWhisper (heat emission) attacks. Further, the encryption retransmission device may also include an Anomaly Detector (AD) that uses three different algorithms acting independently to detect anomalies that may signal an attack. The algorithms of the AD use multi-variant signal analysis. Further, the AD is capable of warning an operator and also executing an "immune system" type of response. Further, the encryption retransmission device may also include an inner case (Faraday Cage) to limit the leaking of radio signals from the encryption retransmission device, and further prevent access by an attacker. Further, the encryption retransmission device may also include a custom resin/plastic outer case to allow integration into multiple use cases. Further, the encryption retransmission device also provides a Four-hour backup battery operation.

Further, the encryption unit and the communication unit of the encryption retransmission device may be comprised of NXP Semiconductors QorIQ LS1012A. Further, the encryption retransmission device may include xPico® 200 Series Embedded Wi-Fi® Gateway. Further, a battery of the encryption retransmission device may be Cellevia Lithium Battery. Further, the inner cage of the encryption retransmission device may be Extruded Aluminum Inner Case that houses the PCB and acts as a Faraday cage. Further, the anomaly detector may include a Raspberry Pi4 loaded with a software application. Further, a case of the anomaly detector is designed to be interlocked with the outer case of the encryption retransmission device (Isidore device) forming an Isidore Quantum device.

Further, the encryption retransmission device (Isidore device) includes an embedded software application.

Further, the anomaly detector may include multiple models such as Azure Anomaly Detector, Anomaly-Transformer, Anomaly Autoencoder, GLocalKD, STL, and RDP. Each AD will have three different models working independently to detect anomalies. An aggregator determines an attack based on the outputs of the three models. Further, the models are randomly installed on each AD.

Further, the PFED incorporated in the encryption retransmission device may be an encrypting device. Further, two encrypting devices are paired to provide communications between two trusted elements via an untrusted network. Further, any device in a network address space may be a trusted element. Further, the network address space may be a subnet in an enterprise network. Further, the device may include a smartphone, a tablet, a laptop, a desktop, a router, etc. are examples of devices in a network address space.

Further, each of the trusted elements, includes an interface, for receiving a trusted interconnect, providing a wired connection between the two encrypting devices, and the trusted element, thereby providing communications between the trusted element and the encrypting device. Further, the encrypting devices are associated with the trusted elements via trusted interconnects. Further, the two encrypting devices need to be paired to allow communication between the trusted elements.

Each sending trusted element generates native packets to be received by another trusted element. Further, the native packets may take any form that would allow the native packets to normally travel between the trusted elements without encrypting devices. Further, the native packets may include a data packet riding in a frame, an IP packet riding in an Ethernet frame, etc. Further, each of the encrypting devices may include an encryption unit and a communication unit linked to the encryption unit via a connectionless interconnect provided by a bus. The connectionless interconnect utilizes a point-to-point connectionless protocol for the transmission of messages between the encryption unit and the communication unit. This point-to-point connectionless interconnect simply sends messages between the encryption unit and the communication unit. No arrangement (such as a handshake) is made between the encryption unit and the communication unit before messages are sent; Each encryption unit is configured with a key for encrypting and decrypting messages. For trusted elements to communicate, the encryption unit's keys of the two encrypting devices must match.

The encryption devices include interfaces and a one-way interface. Each interface may include an Ethernet port, a serial port, or a USB port. Further, the interfaces may be in communication with the trusted element interface of the trusted element via the trusted interconnect, e.g., an Ethernet cable, a serial wire, or a USB cable. Further, the interfaces are not associated with an address. The interfaces are not addressable and therefore, the messages are treated strictly as data, not as network packets before processing by the encryption unit.

The one-way interface may include a GPIO pin, a twisted pair wire, etc. The one-way interface allows for instructions generated by the encryption unit to be signaled to the communication unit. Further, the instructions may instruct the communication unit to halt operations.

Further, the passive interface and an active/addressable interface are both included in each communication unit. Through the connectionless interconnection, the passive interface of the communication unit of one encrypting device is in contact with the second passive interface of the encryption unit of the other encrypting device. The address is linked to the active/addressable interface. To transmit any packets from the passive interface into a form that will be routable to the other communication unit of the paired PFED, the communication unit of one encrypting device is paired with the communication unit of the other encrypting device. The Internet or other untrusted networks are used for communications between communication units. Further, the native packet is also created by one trusted element and sent to the other as part of the communications between the trusted elements. The native packet could be an Ethernet frame, for instance, and could have a frame header containing the source and destination addresses. Through the trusted interconnect and the encryption unit's interface, the native packet is sent to the other encryption unit of the other encrypting device. The encryption unit ingests the entire native pack (including the frame header and the payload) when it receives the native packet and encrypts the entire native packet using the encryption key. To create an outgoing connectionless datagram, the encryption unit additionally adds a connectionless header to the encrypted native packet. An atomic, stateless datagram is the connectionless datagram.

Fields indicating message boundaries (such as length, character count, size, etc.) or other static properties of the message may be included in the connectionless header. Using pre-established criteria connected to the fields of the connectionless header, the receiver is free to accept or reject a frame regardless of the connectionless datagram's contents. The connectionless header may also contain fields like the length. The maximum length of the frame that the receiver (i.e., the encryption unit or the communication unit) will accept may be bound by a pre-specified constant. The receiver may safely discard the connectionless datagram if its size exceeds the predetermined maximum length, as determined by the receiver. The connectionless header does not contain any dynamic properties, so the receiver can process a frame without keeping track of any previous state data. This greatly simplifies the logic and state machine needed by the receiver to correctly process the connectionless header. Human inspection is capable of reaching a known termination in each state. The ability to assess the security boundary logic for certification and correctness is significantly improved as a result.

The untrusted network can comprehend the intricate header, which permits the delivery of the packet to the paired communication unit. The complex header, for instance, contains both a source address and a destination address. Dynamically defined fields may also be present in the complex header. In order to deliver the packet to the paired communication unit (the communication unit of the encrypting device), the untrusted network routes the packet as necessary. A connectionless header is added to the connectionless datagram to create an incoming connectionless datagram after the communication unit of the encrypting device removes the complex header added by the communication unit and receives the packet. The connectionless header may have fields indicating message boundaries (such as length) or other static properties of the message, as previously mentioned.

A trust boundary between the trusted environment (trusted network) and the untrusted environment (untrusted network) is created by the encryption device pair, which offers a cryptographically paired, point-to-point link that enforces logical and physical isolation. By placing independent devices at the endpoints of the connectionless interconnect (i.e., the communication unit and the encryption unit), the physical isolation is achieved. The communication unit handles the intricate native untrusted network processing independently from the encryption unit's straightforward connectionless network processing. By converting the untrusted native packet sent to the active/addressable interface into a connectionless packet, the logical isolation is achieved. The native packet is always encrypted before it passes from the trusted element to the communication unit and is cryptographically authenticated by the encryption unit of the paired encrypting device before it is allowed to pass to the trusted element.

An entity situated on the communication unit side of the connectionless-interconnect cannot create a packet that has meaning for the trusted element unless the key is known to that entity since all packets arriving at the trusted element must be received via the encryption unit. An encrypting device pair, or encrypting device pair, establishes a tunnel across the untrusted network to connect two devices in trusted spaces via a virtual wire through untrusted spaces. The environments that are trusted and untrusted are totally separate from one another. No information is shared about the other. This is meant by "protocol-free".

Networking and encryption "protocols" are separate from one another. Additionally, the encryption units are set up to send inter-PFED control messages so they can communicate with one another.

The cryptographic state of the encryption units is managed by means of these inter-PFED control messages. In order to rekey, manage the cryptographic algorithm, manage the status of the encryption units (e.g., log, online/offline, etc.), start a new session, etc., the PFED's encryption unit may also generate an inter-PFED control message for delivery to the PFED's encryption unit. These inter-PFED control messages are packetized as connectionless packets and travel along the same PFED-to-PFED tunnel as the native packets originating at the trusted element, but they are identified as control messages. They originated at the encryption unit, encrypted by the encryption unit using a key, packetized, and sent along the PFED-to-PFED tunnel. The inter-PFED control messages are not sent to the trusted element because they are marked as control messages.

Further, the present disclosure describes a quantum-resistant and cyber-resilient device with real-time anomaly detection Machine Learning capabilities to secure ICS-SCADA systems.

Further, the present disclosure describes a low cost and Size, Weight, and Power (SWaP) Encryption Retransmission Device (ERD) that is suitable for ICS-SCADA use cases. FIG. 1 is a front schematic diagram of an encryption retransmission device 100 for providing resiliency against attacks, in accordance with some embodiments. Accordingly, the encryption retransmission device 100 may include at least one encryption unit 102-104, at least one communication unit 106, and at least one galvanic isolator 108-110.

Further, the at least one encryption unit 102-104 may be configured for encrypting an egressing native packet received from at least one device using at least one encryption key to create an encrypted egressing native packet. Further, the at least one encryption unit 102-104 may be configured for adding a connectionless header to the encrypted egressing native packet to form an egressing connectionless datagram. Further, the at least one encryption unit 102-104 may be configured for receiving an ingressing connectionless datagram comprising an ingressing encrypted native packet. Further, the at least one encryption unit 102-104 may be configured for decrypting the encrypted ingressing native packet using the at least one encryption key. Further, the at least one encryption unit 102-104 may be a computing device.

Further, the at least one communication unit 106 may be communicatively coupled with the at least one encryption unit 102-104. Further, the at least one communication unit 106 may be paired with at least one first communication unit 306 of at least one first encryption retransmission device 300. Further, the encryption retransmission device 100 and the at least one first encryption retransmission device 300 may be cryptographically bounded. Further, the at least one communication unit 106 may be configured for receiving the egressing connectionless datagram. Further, the at least one communication unit 106 may be configured for adding a complex header to the egressing connectionless datagram for forming an egressing packet for delivery to the at least one first encryption retransmission device 300. Further, the at least one communication unit 106 may be configured for receiving an ingressing packet comprising the encrypted ingressing native packet and a complex header from the at least one first encryption retransmission device 300. Further, the at least one communication unit 106 may be configured for removing the complex header from the ingressing packet. Further, the at least one communication unit 106 may be configured for adding a connectionless header to the ingressing packet for forming an ingressing connectionless datagram. Further, the ingressing connectionless datagram may include the encrypted ingressing native packet. Further, the at least one communication unit 106 may be a computing unit.

Further, the at least one galvanic isolator 108-110 electromagnetically coupled with the at least one encryption unit 102-104 and the at least one communication unit 106. Further, the at least one galvanic isolator 108-110 may be configured for galvanically isolating the at least one encryption unit 102-104 and the at least one communication unit 106. Further, the at least one galvanic isolator 108-110 electrically isolates the at least one encryption unit 102-104 and the at least one communication unit 106. Further, the at least one galvanic isolator 108-110 provides galvanic isolation on power signals and data signals associated with the at least one encryption unit 102-104 and the at least one communication unit 106 preventing the at least one encryption unit 102-104 and the at least one communication unit 106 from attacks such as Powerhammer, Bitwhisper, etc. Further, the at least one galvanic isolator 108-110 may include an opto-coupler, a magneto-coupler, a piezo-couple, an opto-emulator, a transformer, a decoupling capacitor, an optoisolator, a digital isolator, a signal isolation transformer, an isolation amplifier, a signal transfer device having a transmitter and a receiver that are electrically isolated from one another and exchange signals such as optical, radio, ultrasound signals, etc. Further, the power signals and the data signals received by the at least one galvanic isolator 108-110 for at least one of the at least one encryption unit 102-104 and the at least one communication unit 106 may be isolated by the at least one galvanic isolator 108-110 and the power signals and the data signals may be separately provided to at least one of the at least one encryption unit 102-104 and the at least one communication via the at least one galvanic isolator 108-110.

In further embodiments, the encryption retransmission device 100 may include at least one interface module 126. Further, the at least one interface module 126 may be communicatively coupled with at least one of the at least one encryption unit 102-104 and the at least one communication unit 106. Further, the at least one interface module 126 may include a plurality of interfaces 112-120. Further, the plurality of interfaces 112-120 may include an InfraRed interface, an Ethernet interface, a USB interface, a Wi-Fi interface, a Radio interface, a SATCOM interface, a Bluetooth interface, etc. Further, the at least one interface module 126 may communicate the power signals and the data signals to at least one of the at least one encryption unit 102-104 and the at least one communication unit 106.

Further, in an embodiment, the plurality of interfaces 112-120 may include at least one first interface. Further, the egressing native packet received at the at least one first interface from the at least one device.

Further, in an embodiment, the plurality of interfaces 112-120 further may include at least one second interface. Further, the receiving of the ingressing connectionless datagram comprising the ingressing encrypted native packet comprising receiving the ingressing connectionless datagram comprising the ingressing encrypted native packet at the at least one second interface.

Further, in an embodiment, the at least one interface module 126 may be communicatively coupled with the at least one communication unit 106. Further, the at least one communication unit 106 of the encryption retransmission device 100 may be paired to the at least one communication unit 106 of the at least one first encryption retransmission device 300 via the at least one interface module 126.

Further, in an embodiment, the at least one interface module 126 may be electromagnetically coupled with at least one of the at least one encryption unit 102-104 and the at least one communication unit 106 via the at least one galvanic isolator 108-110.

Further, in an embodiment, the plurality of interfaces 112-120 further may include at least one third interface. Further, the at least one third interface manages the at least one communication unit 106.

In further embodiments, the encryption retransmission device 100 may include a power input interface 122. Further, the power input interface 122 may be electromagnetically coupled to the at least one communication unit 106 and the at least one encryption unit 102-104 via the at least one galvanic isolator 108-110. Further, the power input interface 122 may be configured for receiving power from at least one external power source for powering the at least one encryption unit 102-104 and the at least one communication unit 106.

In further embodiments, the encryption retransmission device 100 may include a resin enclosure comprised of at least one resin. Further, the resin enclosure encloses the encryption retransmission device 100. Further, the at least one resin absorbs heat. Further, the resin enclosure does not radiate the heat based on the at least one resin. Further, the at least one resin may include an epoxy resin.

In further embodiments, the encryption retransmission device 100 may include an inner enclosure for enclosing the encryption retransmission device 100. Further, the inner enclosure may be comprised of at least one metal. Further, the inner enclosure forms a Faraday cage around the encryption retransmission device 100. Further, the at least one metal may include aluminum, copper, steel, etc.

In further embodiments, the encryption retransmission device 100 may include an outer enclosure disposed around the inner enclosure. Further, the outer enclosure may be comprised of at least one material. Further, the at least one material may include a resin, a plastic, etc.

In further embodiments, the encryption retransmission device 100 may include at least one power source 124 electrically coupled with the at least one encryption unit 102-104 and the at least one communication unit 106. Further, the at least one power source 124 may be configured for powering the at least one encryption unit 102-104 and the at least one communication unit 106 for at least one time period. Further, the at least one power source 124 may be a battery.

Figure 3:
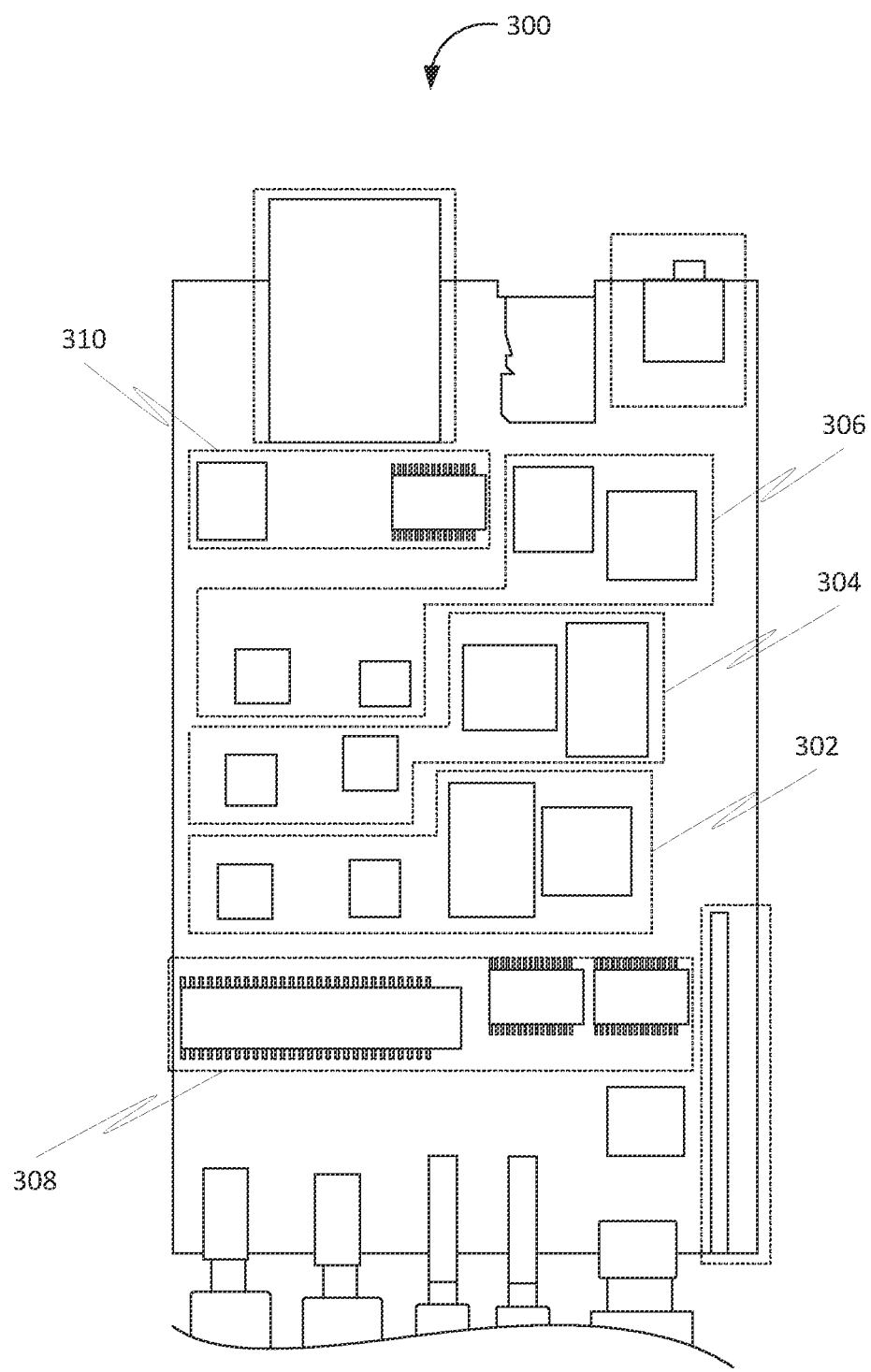
FIG. 3 is a front schematic diagram of the at least one first encryption retransmission device 300, in accordance with some embodiments.

Further, the at least one first encryption retransmission device 300 may include at least one first encryption unit 302-304, the at least one first communication unit 306, at least one first galvanic isolator 308-310, as shown in FIG. 3. Further, the at least one first encryption unit 302-304 may be configured for encrypting an egressing native packet received from at least one second device using at least one encryption key to create an encrypted egressing native packet. Further, the at least one first encryption unit 302-304 may be configured for adding a connectionless header to the encrypted egressing native packet to form an egressing connectionless datagram. Further, the at least one first encryption unit 302-304 may be configured for receiving an ingressing connectionless datagram comprising an ingressing encrypted native packet. Further, the at least one first encryption unit 302-304 may be configured for decrypting the encrypted ingressing native packet using the at least one encryption key. Further, the at least one first communication unit 306 paired with the at least one communication unit 106 of the encryption retransmission device 100. Further, the at least one first communication unit 306 may be configured for receiving the egressing connectionless datagram. Further, the at least one first communication unit 306 may be configured for adding a complex header to the egressing connectionless datagram for forming an egressing packet for delivery to the encryption retransmission device 100. Further, the at least one first communication unit 306 may be configured for receiving an ingressing packet comprising the encrypted ingressing native packet and a complex header from the encryption retransmission device 100. Further, the at least one first communication unit 306 may be configured for removing the complex header from the ingressing packet. Further, the at least one first communication unit 306 may be configured for adding a connectionless header to the ingressing packet for forming an ingressing connectionless datagram. Further, the ingressing connectionless datagram may include the encrypted ingressing native packet. Further, the at least one first galvanic isolator may be electromagnetically coupled with the at least one first encryption unit 302-304 and the at least one first communication unit 306. Further, the at least one first galvanic isolator may be configured for galvanically isolating the at least one first encryption unit 302-304 and the at least one first communication unit 306.

Further, in an embodiment, the at least one encryption unit 102-104 may be configured for sending at least one message to the at least one first encryption unit 302-304.

Further, in an embodiment, the at least one message manages at least one cryptographic state of the at least one encryption unit 102-104 and the at least one first encryption unit 302-304.

Further, in an embodiment, the at least one message manages at least one encryption key associated with the at least one encryption unit 102-104 and the at least one first encryption unit 302-304.

Further, in an embodiment, the at least one message manages at least one algorithm associated with the at least one encryption unit 102-104 and the at least one first encryption unit 302-304.

Further, in an embodiment, the at least one message manages at least one status associated with the at least one encryption unit 102-104 and the at least one first encryption unit 302-304.

Further, in some embodiments, the at least one encryption unit 102-104 may be communicatively coupled to the at least one communication via a one-way connection for providing at least one instruction to the at least one communication unit 106.

In further embodiments, the encryption retransmission device 100 may be associated with at least one anomaly detector. Further, the at least one anomaly detector may be electromagnetically coupled to at least one of the at least one encryption unit 102-104 and the at least one communication unit 106 via the at least one galvanic isolator 108-110 and the at least one device. Further, the at least one anomaly detector may be configured for analyzing at least one signal (user traffic) associated with at least one of the at least one encryption unit 102-104 and the at least one communication unit 106 and the at least one device using at least one machine learning model. Further, each of the at least one machine learning model separately detects anomalies by performing multi-variant signal analysis. Further, the at least one anomaly detector may be configured for determining an attack associated with the encryption retransmission device 100 based on the analyzing. Further, the determining of the attack may be based on the detecting of the anomalies. Further, the at least one anomaly detector may be configured for generating an alert for the attack based on the determining of the attack. Further, the at least one anomaly detector may be a computing device comprising a processor, at least one communication interface, and a storage device.

Further, in an embodiment, the at least one anomaly detector may be physically located anywhere on a network connecting the encryption retransmission device 100 and the at least one first encryption retransmission device 300.

Figure 2:
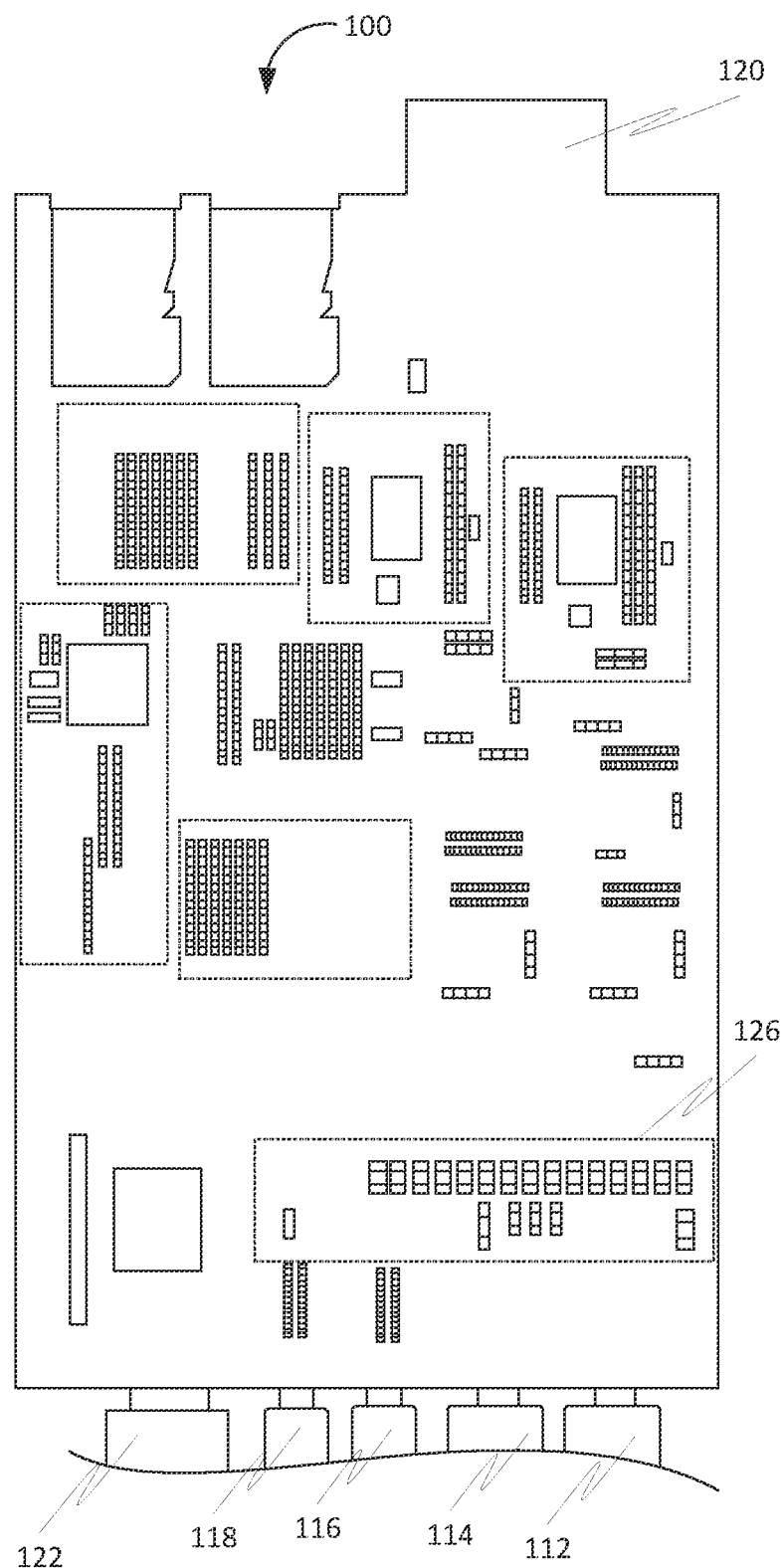
FIG. 2 is a rear schematic diagram of the encryption retransmission device 100, in accordance with some embodiments.

FIG. 2 is a rear schematic diagram of the encryption retransmission device 100, in accordance with some embodiments.

FIG. 3 is a front schematic diagram of the at least one first encryption retransmission device 300, in accordance with some embodiments.

Figure 4:
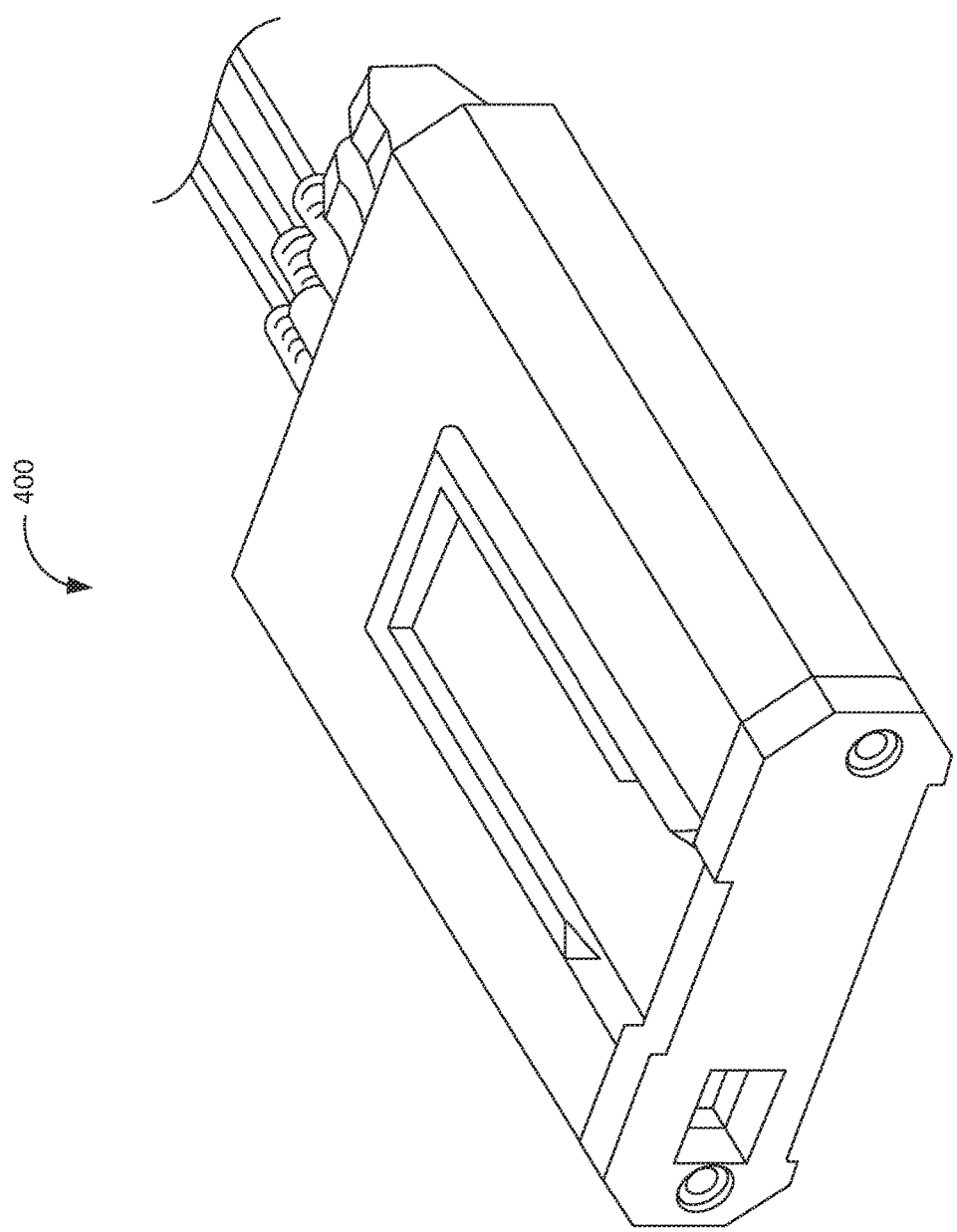
FIG. 4 is a top perspective view of an encryption retransmission device 400 for providing resiliency against attacks, in accordance with some embodiments.

FIG. 4 is a top perspective view of an encryption retransmission device 400 for providing resiliency against attacks, in accordance with some embodiments. Further, the encryption retransmission device 400 may include an inner enclosure 502, an outer enclosure 802, a PCB (printed circuit board) 1002, a front cap 702, and a rear cap 602. Further, the PCB 1002 may include a communication unit, an encryption unit, a galvanic isolator, a plurality of interfaces, etc.

Figure 5:
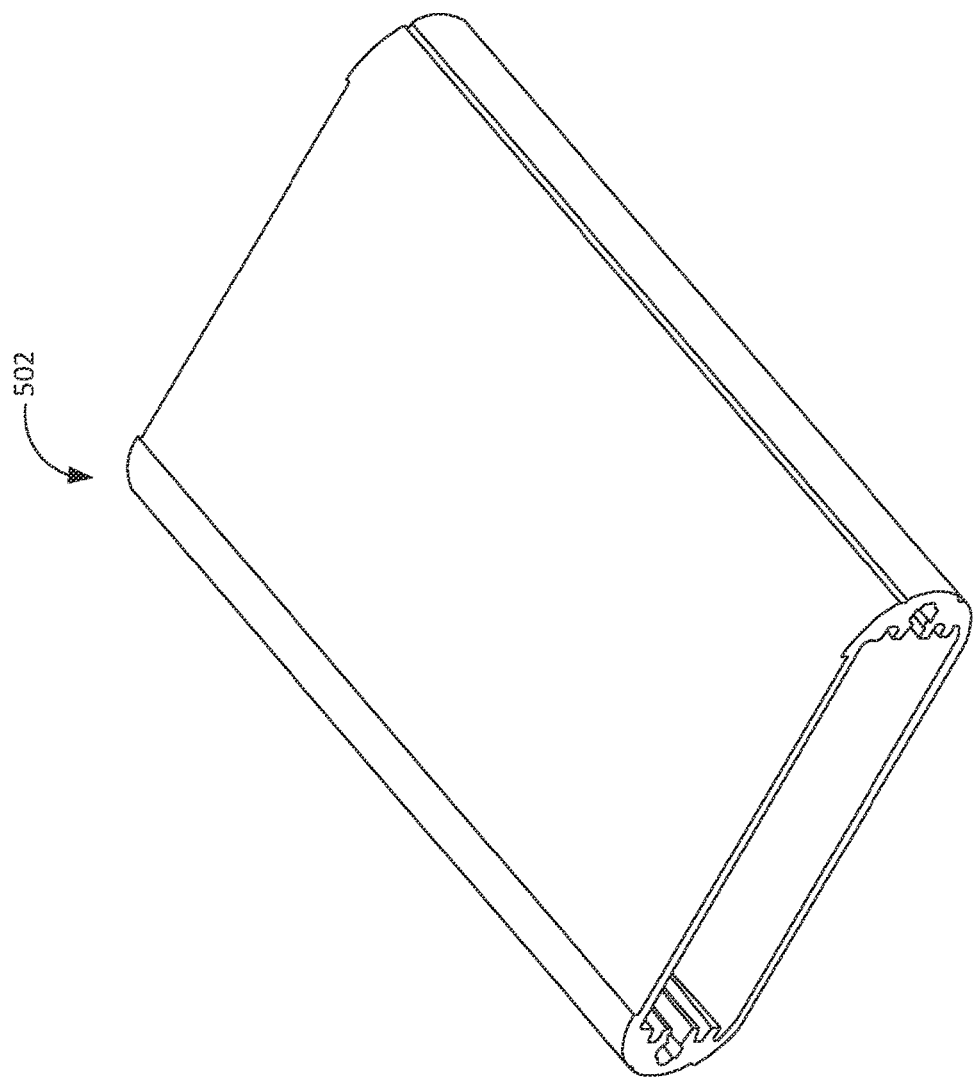
FIG. 5 is a top perspective view of the inner enclosure 502 of the encryption retransmission device 400, in accordance with some embodiments.

FIG. 5 is a top perspective view of the inner enclosure 502 of the encryption retransmission device 400, in accordance with some embodiments.

Figure 6:
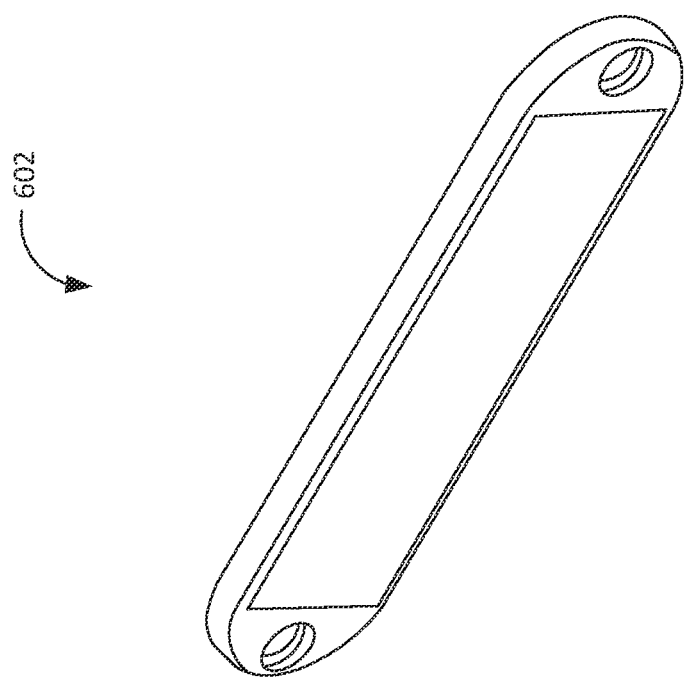
FIG. 6 is a top perspective view of the rear cap 602 of the encryption retransmission device 400, in accordance with some embodiments.

FIG. 6 is a top perspective view of the rear cap 602 of the encryption retransmission device 400, in accordance with some embodiments.

Figure 7:
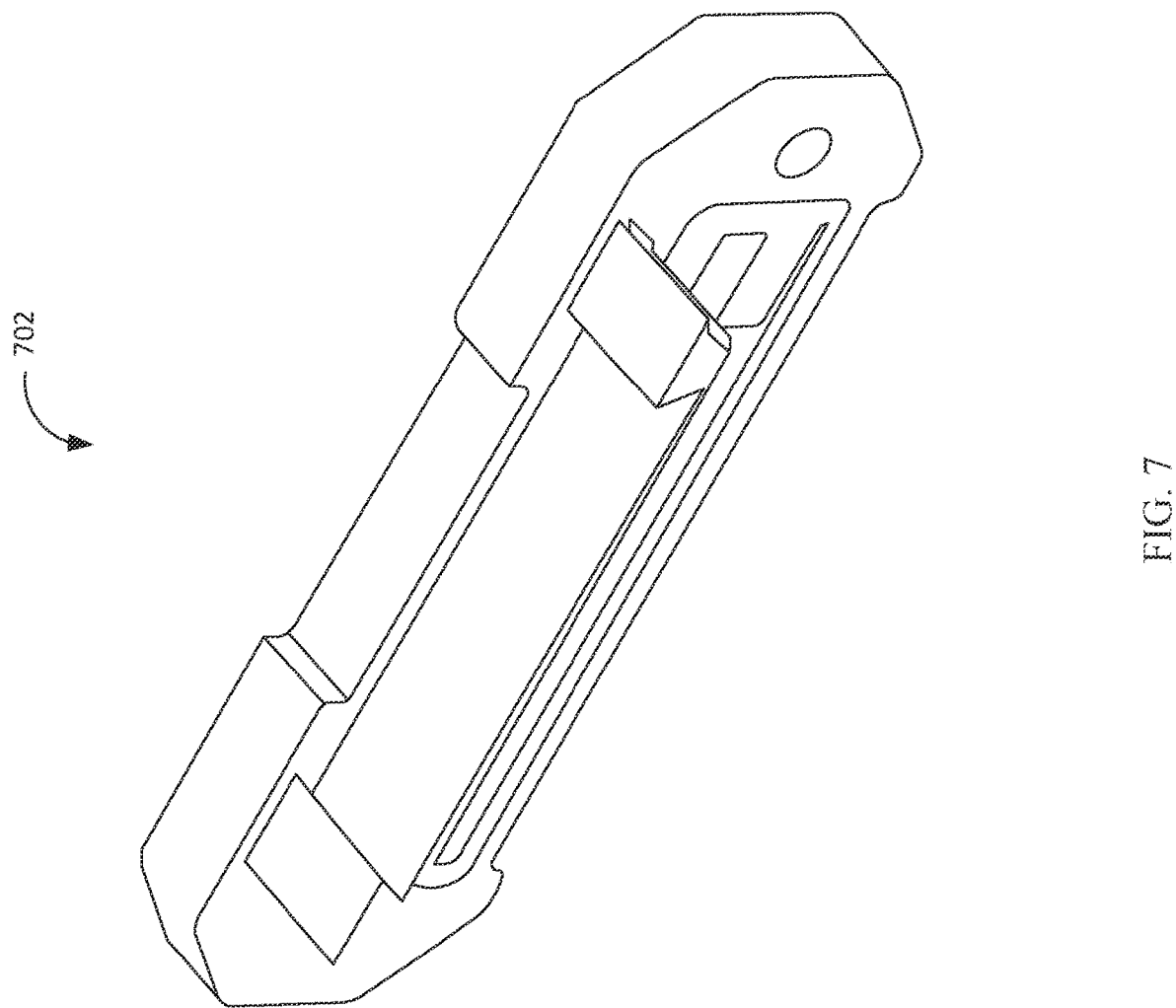
FIG. 7 is a top perspective view of the front cap 702 of the encryption retransmission device 400, in accordance with some embodiments.

FIG. 7 is a top perspective view of the front cap 702 of the encryption retransmission device 400, in accordance with some embodiments.

Figure 8:
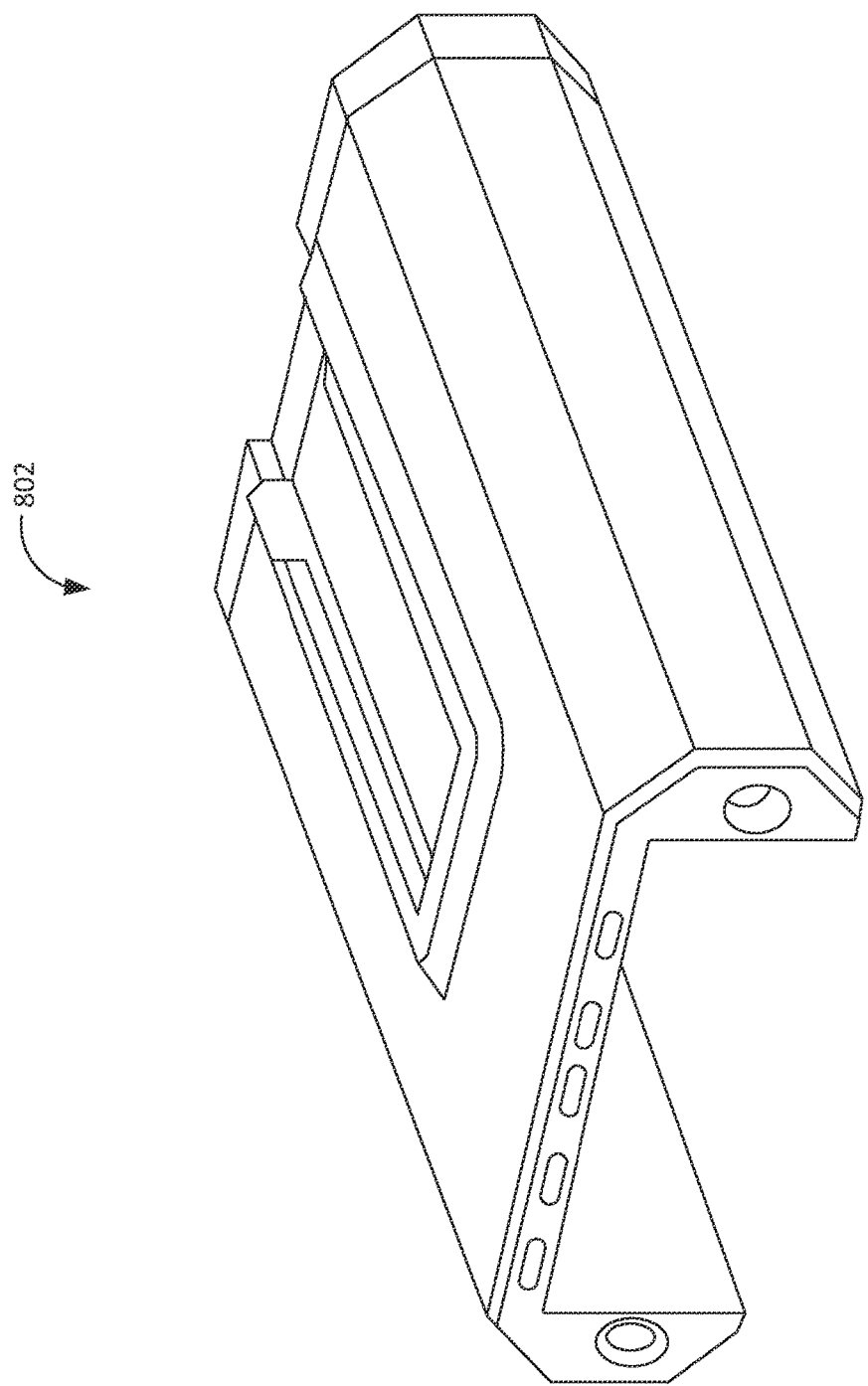
FIG. 8 is a top perspective view of the outer enclosure 802 of the encryption retransmission device 400, in accordance with some embodiments.

FIG. 8 is a top perspective view of the outer enclosure 802 of the encryption retransmission device 400, in accordance with some embodiments.

Figure 9:
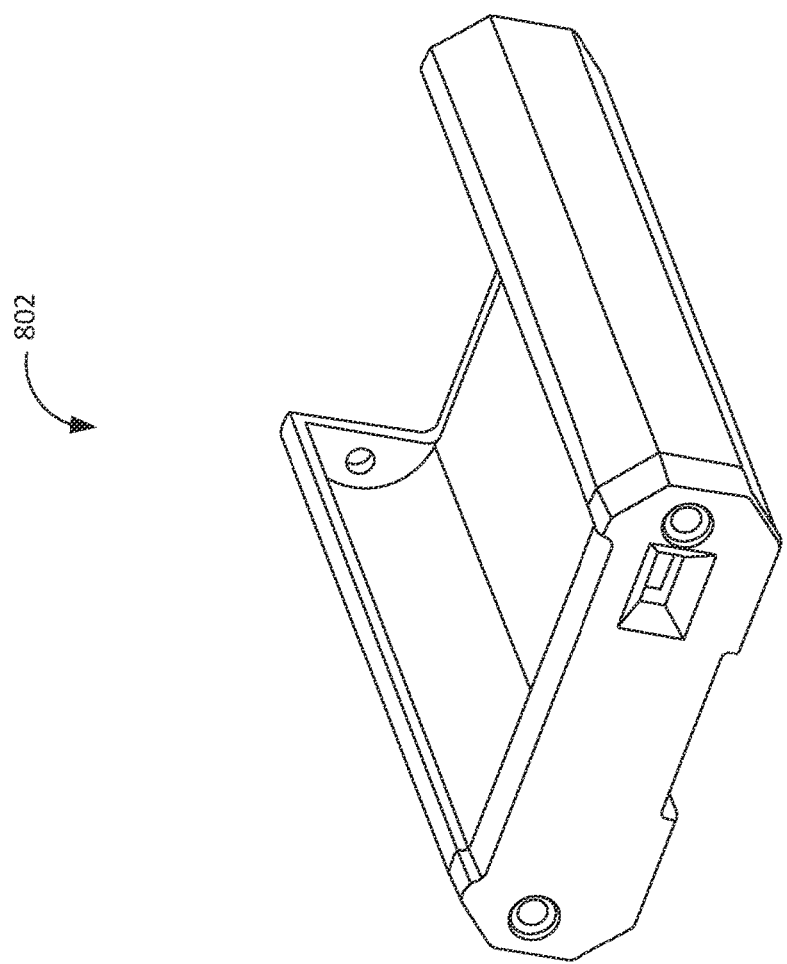
FIG. 9 is a bottom perspective view of the outer enclosure 802 of the encryption retransmission device 400, in accordance with some embodiments.

FIG. 9 is a bottom perspective view of the outer enclosure 802 of the encryption retransmission device 400, in accordance with some embodiments.

Figure 10:
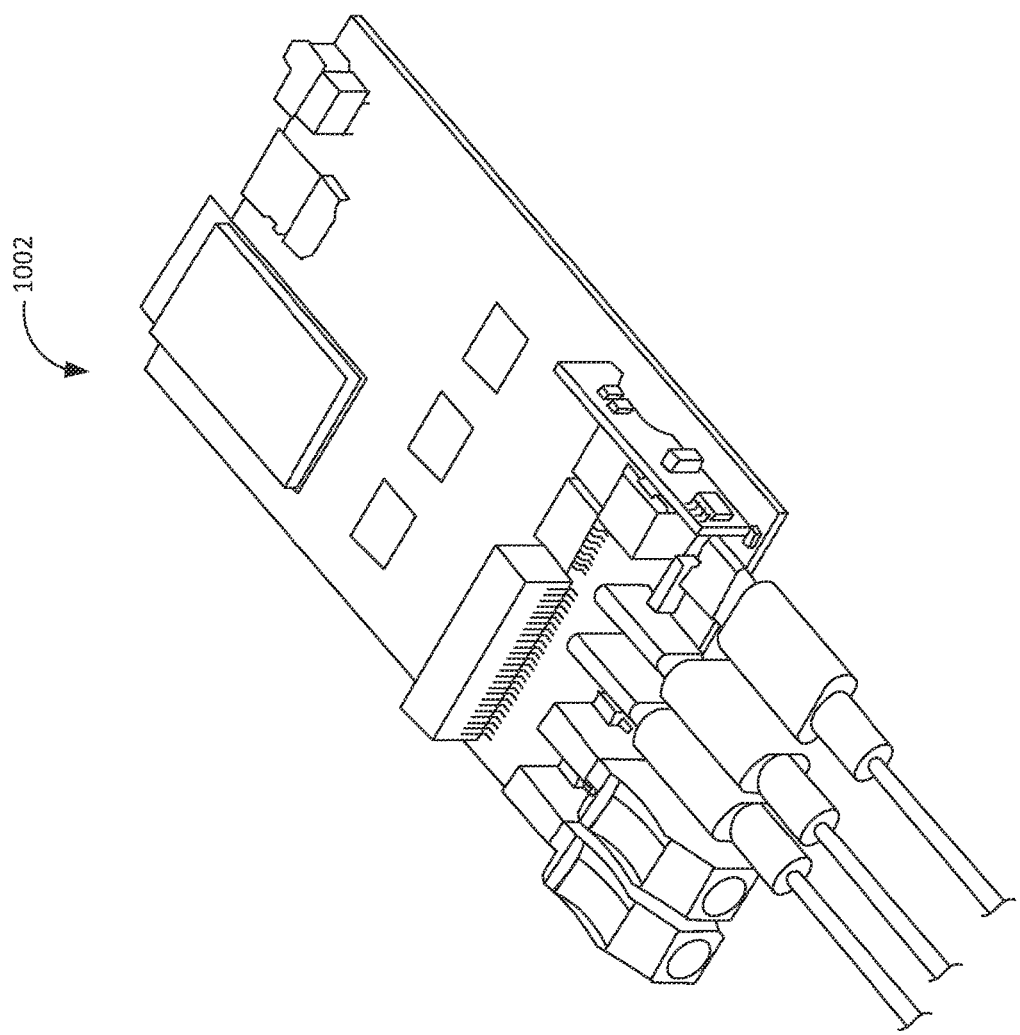
FIG. 10 is a top perspective view of the PCB 1002 of the encryption retransmission device 400, in accordance with some embodiments.

FIG. 10 is a top perspective view of the PCB 1002 of the encryption retransmission device 400, in accordance with some embodiments.

Figure 11:
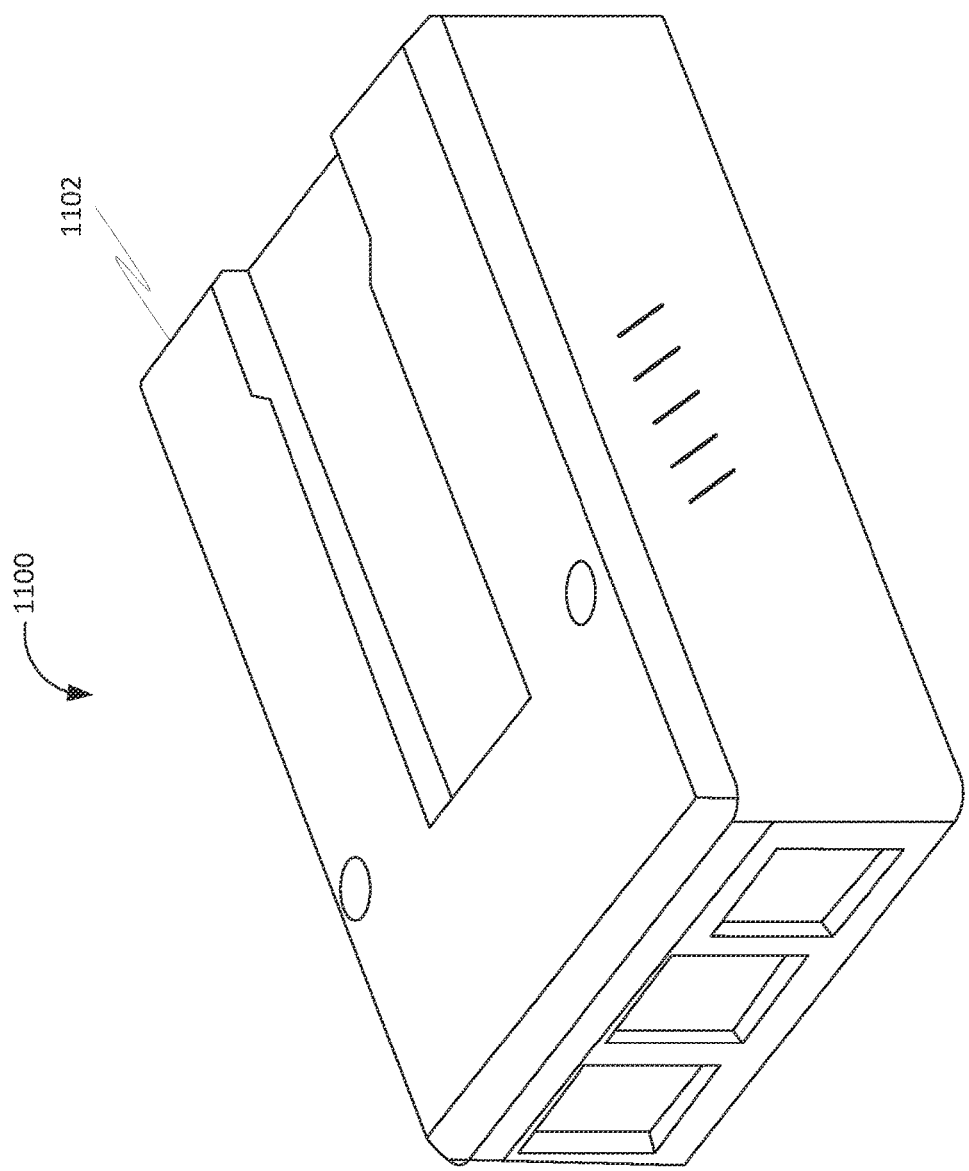
FIG. 11 is a top perspective view of an anomaly detector 1100 for the encryption retransmission device 400, in accordance with some embodiments.

FIG. 11 is a top perspective view of an anomaly detector 1100 for the encryption retransmission device 400, in accordance with some embodiments. Further, the anomaly detector 1100 may include an enclosure 1102 and a PCB (printed circuit board) 1302 (Raspberry Pi processor), etc. Further, the enclosure 1102 may include a top enclosure portion 1202 and a bottom enclosure portion 1402.

Figure 12:
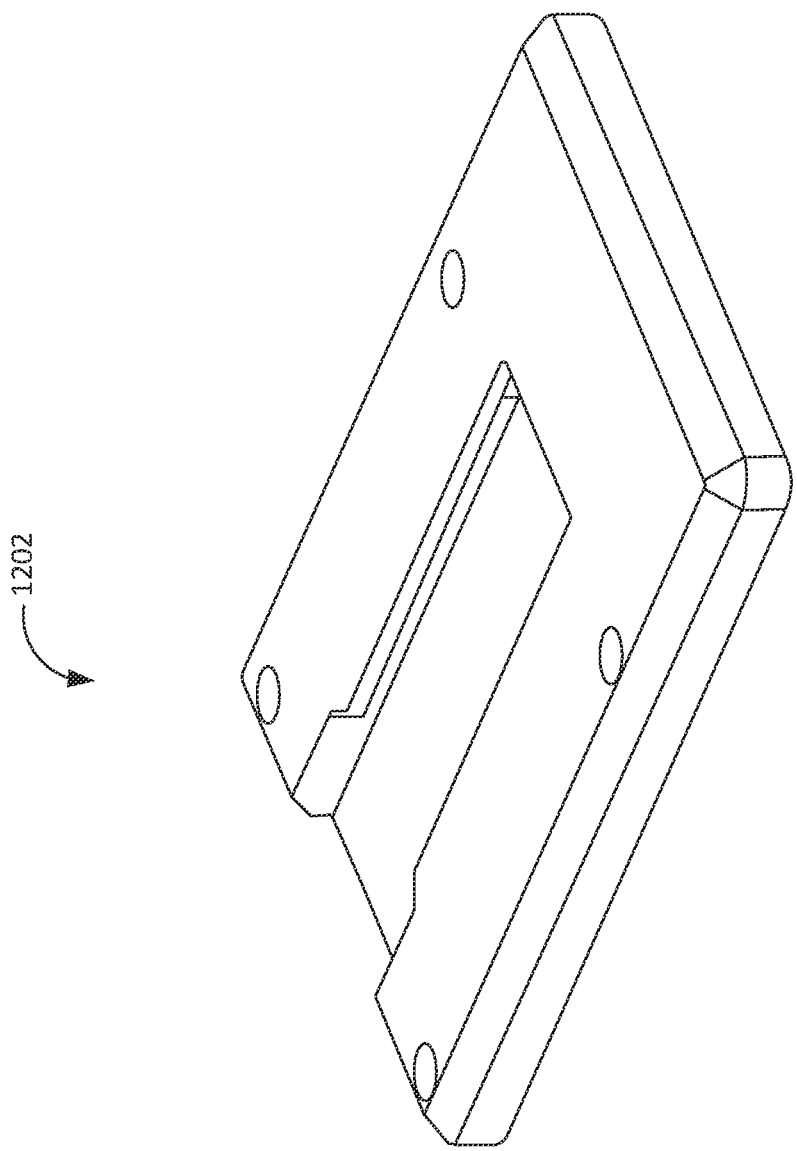
FIG. 12 is a top perspective view of the top enclosure portion 1202 of the enclosure 1102 of the anomaly detector 1100, in accordance with some embodiments.

FIG. 12 is a top perspective view of the top enclosure portion 1202 of the enclosure 1102 of the anomaly detector 1100, in accordance with some embodiments.

Figure 13:
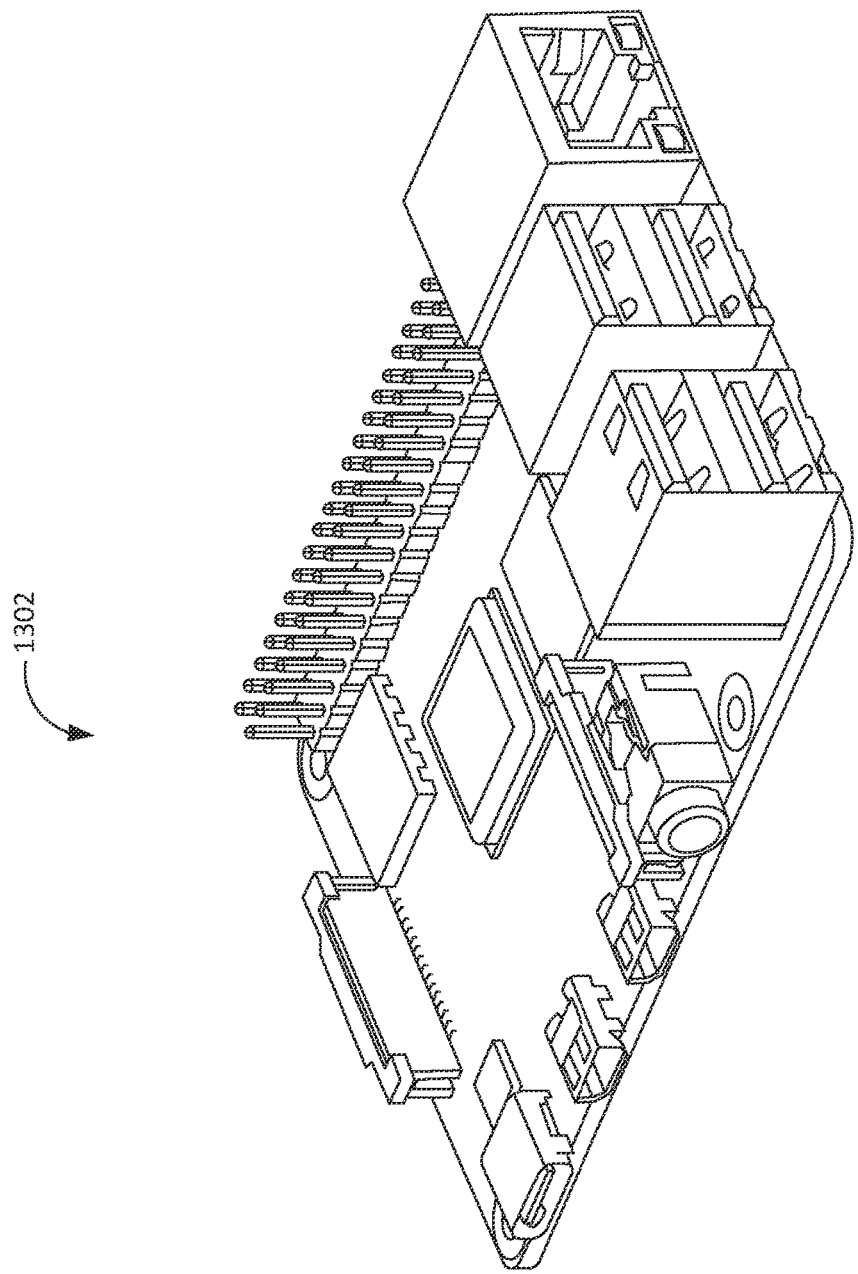
FIG. 13 is a top perspective view of the PCB 1302 of the anomaly detector 1100, in accordance with some embodiments.

FIG. 13 is a top perspective view of the PCB 1302 of the anomaly detector 1100, in accordance with some embodiments.

Figure 14:
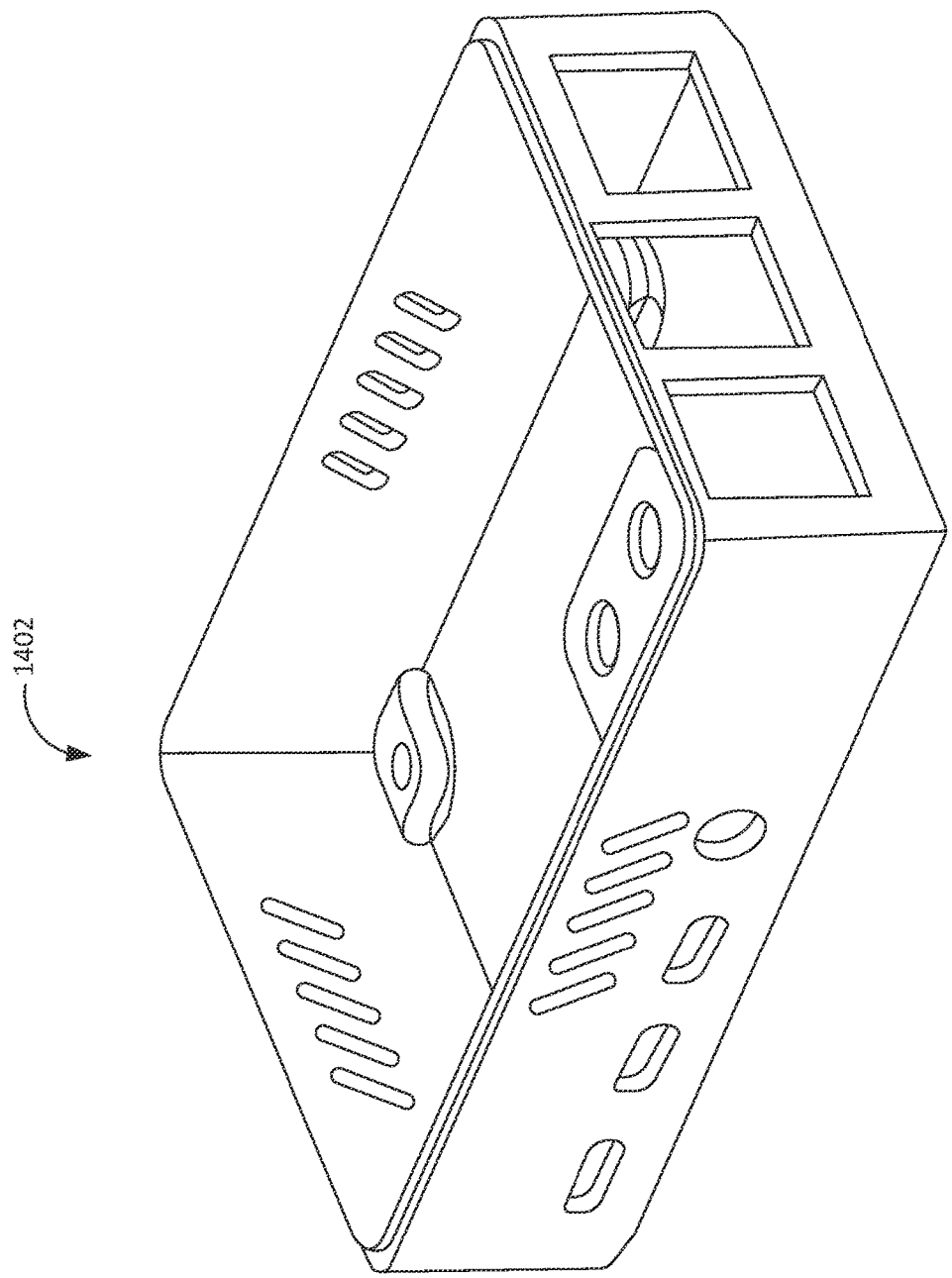
FIG. 14 is a top perspective view of the bottom enclosure portion 1402 of the enclosure 1102 of the anomaly detector 1100, in accordance with some embodiments.

FIG. 14 is a top perspective view of the bottom enclosure portion 1402 of the enclosure 1102 of the anomaly detector 1100, in accordance with some embodiments.

Figure 15:
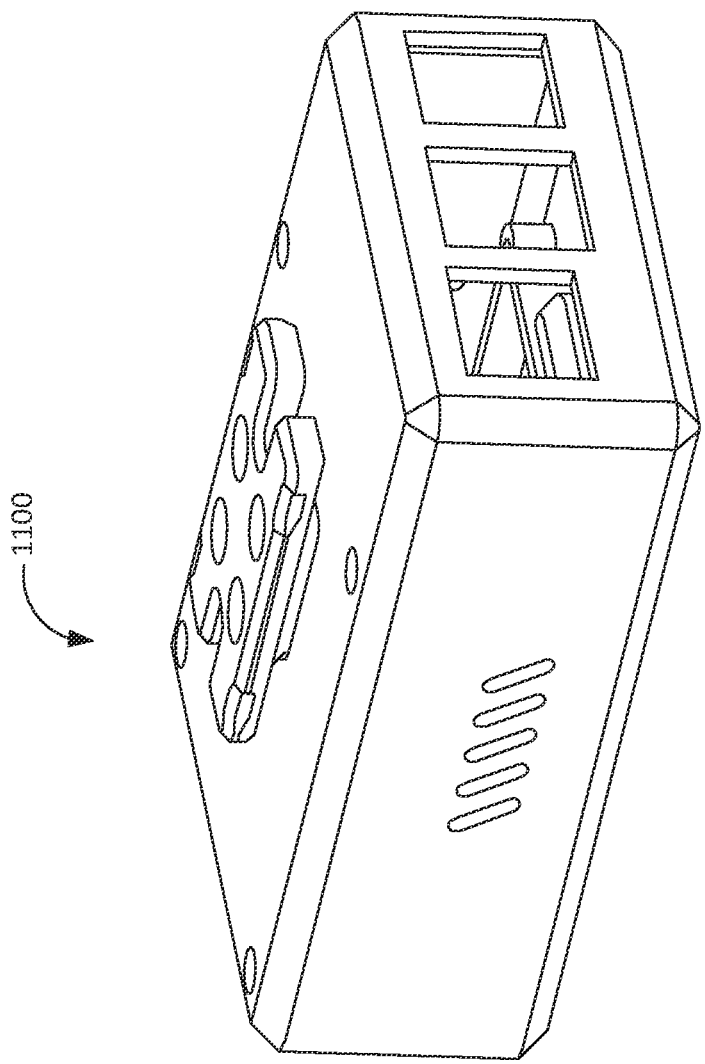
FIG. 15 is a bottom perspective view of the anomaly detector 1100 for the encryption retransmission device 400, in accordance with some embodiments.

FIG. 15 is a bottom perspective view of the anomaly detector 1100 for the encryption retransmission device 400, in accordance with some embodiments.

Figure 16:
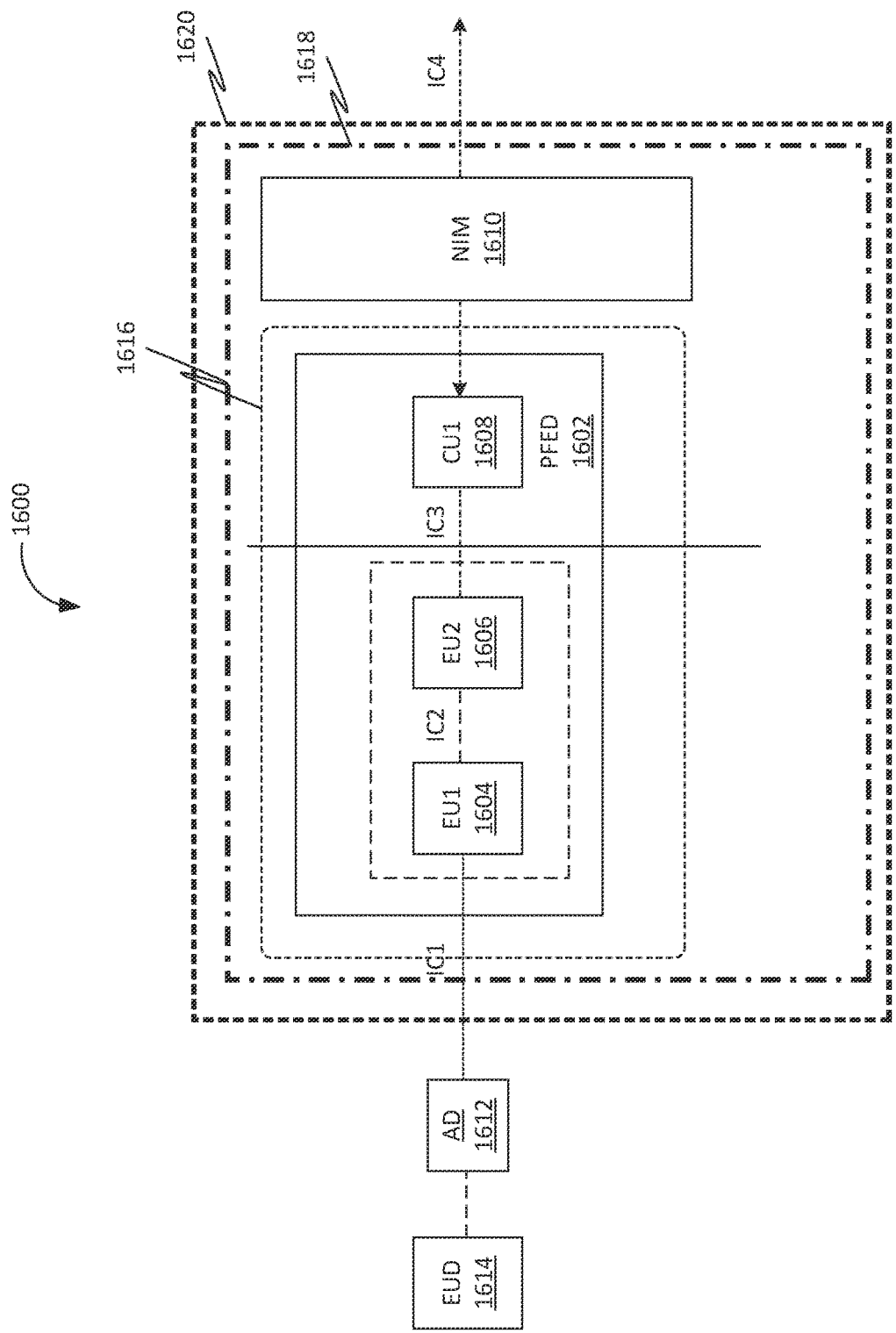
FIG. 16 is a block diagram of an encryption retransmission device 1600 for providing resiliency against attacks with an anomaly detector (AD) 1612, in accordance with some embodiments.

FIG. 16 is a block diagram of an encryption retransmission device 1600 for providing resiliency against attacks with an anomaly detector (AD) 1612, in accordance with some embodiments. Further, the encryption retransmission device 1600 may be an Isidore Quantum device. Further, the encryption retransmission device 1600 may include a protocol free encryption device (PFED) 1602, and a network interface module (NIM) 1610. Further, the network interface module (NIM) 1610 may include an Ethernet interface, a USB interface, a Wi-Fi interface, a Radio interface, a SATCOM interface, a Bluetooth interface, etc. Further, the protocol free encryption device (PFED) 1602 may include a first encryption unit (EU1) 1604 and a second encryption unit (EU2) 1606, and a communication unit (CU1) 1608. Further, the protocol free encryption device (PFED) 1602 may be galvanically isolated using a galvanic isolator 1616. Further, the galvanic isolator 1616 may provide galvanic isolation of data and power channel (pins) to the PFED 1602. Further, the protocol free encryption device (PFED) 1602 and the galvanic isolator 1616 may be encased inside a Faraday cage 1618. Further, the protocol free encryption device (PFED) 1602, the galvanic isolator 1616, and the Faraday cage 1618 may be encased inside an outer resin/plastic cage 1620. Further, the encryption retransmission device 1600 may be associated with an external user device 1614. Further, in an embodiment, the anomaly detector (AD) 1612 may be physically located anywhere on a network connecting the encryption retransmission device 1600 and one or more other encryption retransmission devices. Further, the encryption retransmission device 1600 and one or more other encryption retransmission devices may be cryptographically bounded.

Figure 17:
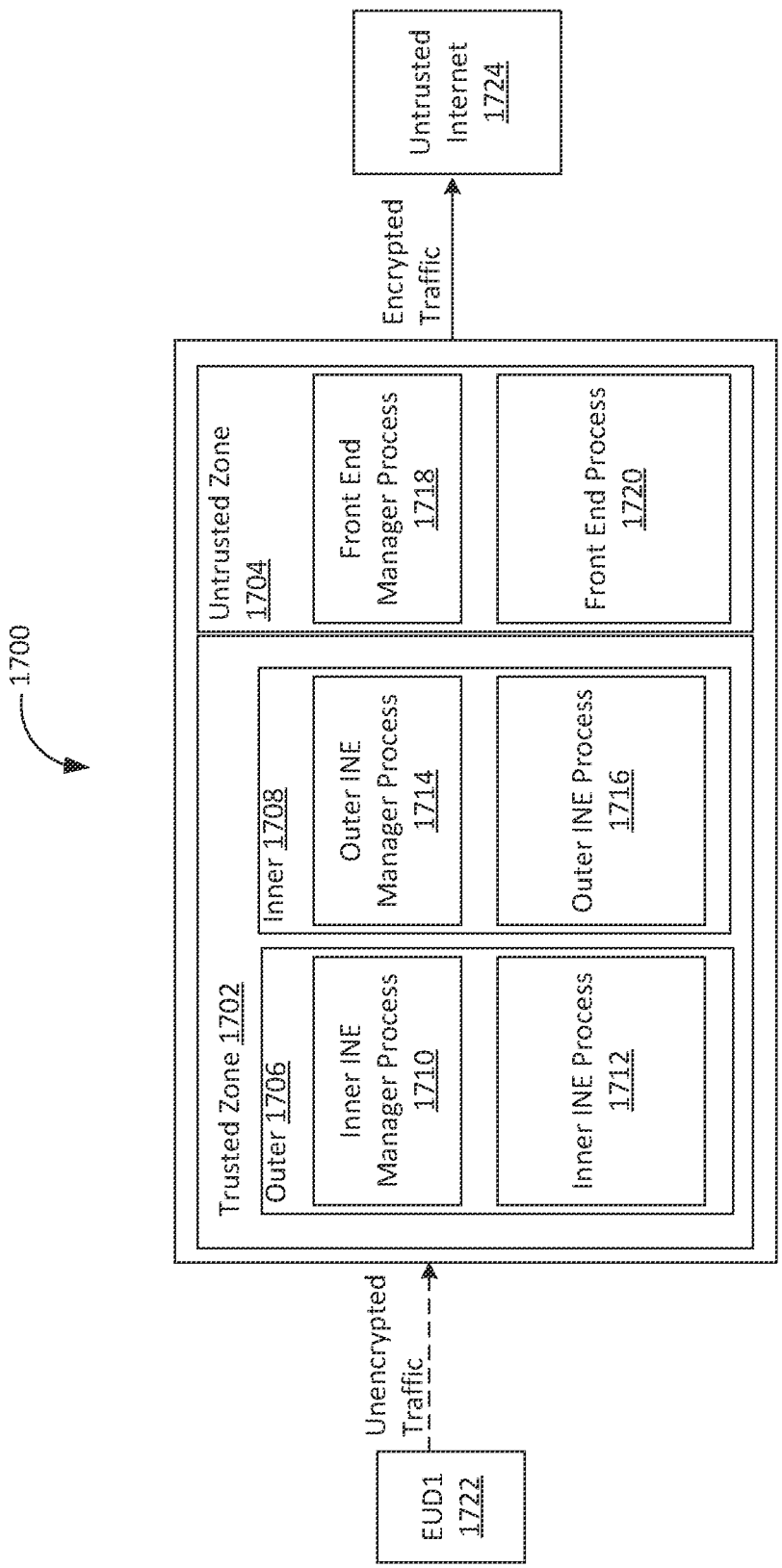
FIG. 17 is a block diagram representing a software application associated with an Isidore device 1700 for providing resiliency against attacks, in accordance with some embodiments.

FIG. 17 is a block diagram representing a software application associated with an Isidore device 1700 for providing resiliency against attacks, in accordance with some embodiments. Further, the software application of the Isidore device 1700 may include a trusted zone 1702 and an untrusted zone 1704. Further, the trusted zone 1702 may include an outer trusted zone 1706 and an inner trusted zone

1708. Further, the outer trusted zone 1706 may include an inner inline network encryptor (INE) manager process 1710 and an inner INE process 1712. Further, the inner trusted zone 1708 may include an outer INE manager process 1714 and an outer INE process 1716. Further, the untrusted zone 1704 may include a front-end manager process 1718 and a front end process 1720. Further, the software application of the Isidore device 1700 may receive unencrypted traffic from a first external user device (EUD1) 1722. Further, the software application of the Isidore device 1700 may transmit encrypted traffic to the untrusted internet 1724.

Figure 18:
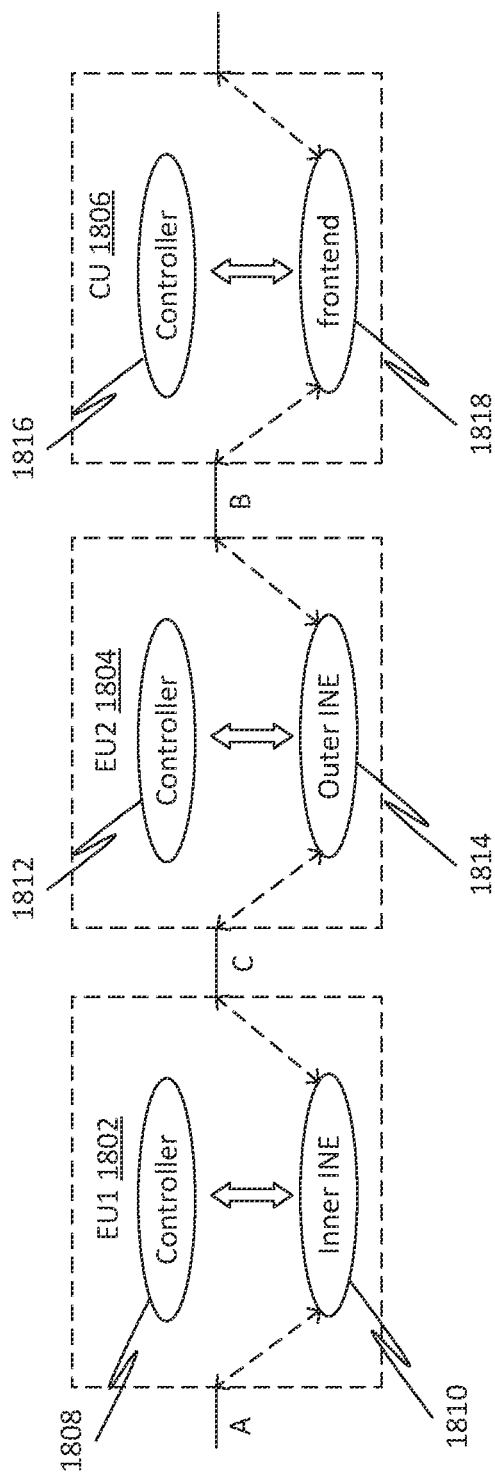
FIG. 18 is a block diagram representing a software model for an interface of the Isidore device 1700, in accordance with some embodiments.

FIG. 18 is a block diagram representing a software model for an interface of the Isidore device 1700, in accordance with some embodiments. Further, a first encryption unit (EU1) 1802 may include a controller 1808 and an inner INE 1810. Further, a second encryption unit (EU2) 1804 may include a controller 1812 and an outer INE 1814. Further, a communication unit (CU) 1806 may include a controller 1816 and a front end 1818.

Further, for the EU1 1802/EU2 1804, the INE is a user space application to interact with the interfaces. The INEs encapsulate or de-encapsulate frames as the traffic passes between the interfaces. The frontend application is not the only application interfacing with the U-NAS since the CU 1806 must interact with a working Internet. However, the frontend application is the only application that forwards PFED frames onto EU2 1804.

Figure 19:
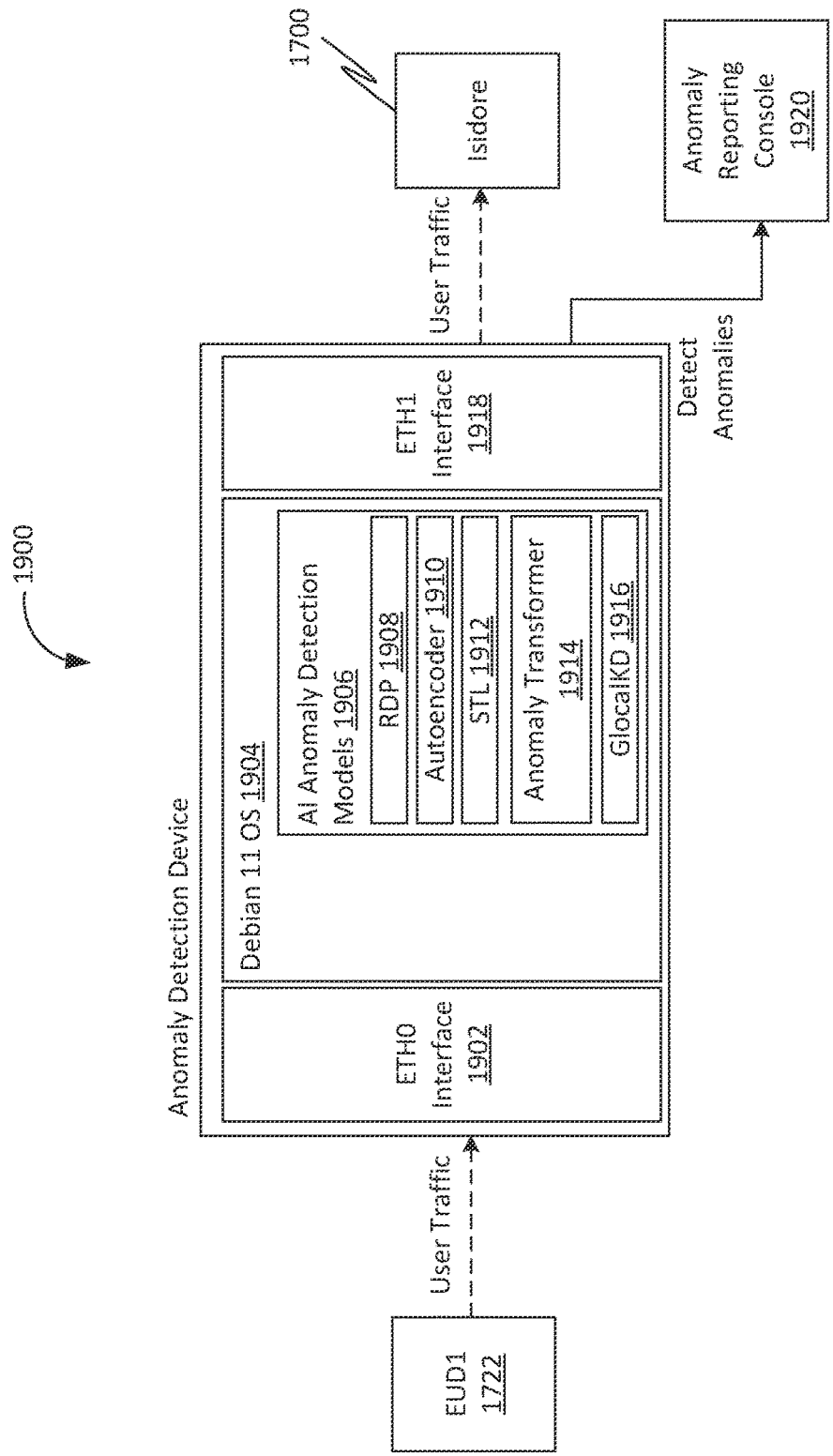
FIG. 19 is a block diagram of an anomaly detector (AD) 1900 for the Isidore device 1700, in accordance with some embodiments.

FIG. 19 is a block diagram of an anomaly detector (AD) 1900 for the Isidore device 1700, in accordance with some embodiments. Further, the anomaly detector (AD) 1900 may include a first interface (ETH0 interface) 1902, a processor (Debian 11 OS) 1904, and a second interface (ETH1 interface) 1918. Further, the processor (Debian 11 OS) 1904 may include AI anomaly detection models 1906 comprising RDP 1908, Autoencoder 1910, STL 1912, Anomaly Transformer 1914, and GlocalKD 1916. Further, the anomaly detector (AD) 1900 may receive user traffic from the first external user device (EUD1) 1722. Further, the anomaly detector (AD) 1900 may transmit the user traffic which is unencrypted to the Isidore device 1700. Further, the anomaly detector (AD) 1900 may detect anomalies and report the anomalies to the anomaly reporting console 1920.

Figure 20:
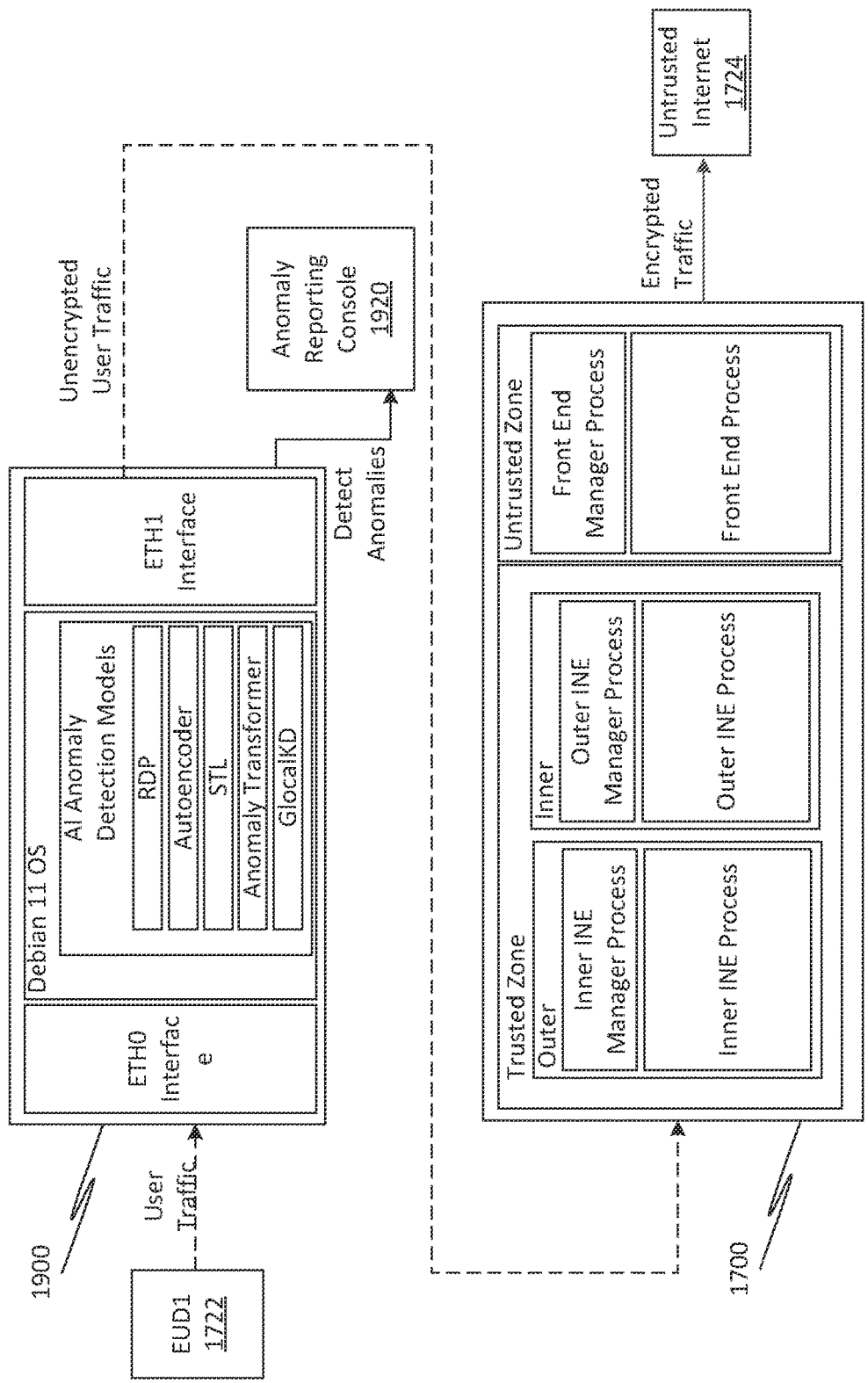
FIG. 20 is a block diagram of the anomaly detector (AD) 1900 with the Isidore device 1700, in accordance with some embodiments.

FIG. 20 is a block diagram of the anomaly detector (AD) 1900 with the Isidore device 1700, in accordance with some embodiments.

Figure 21:
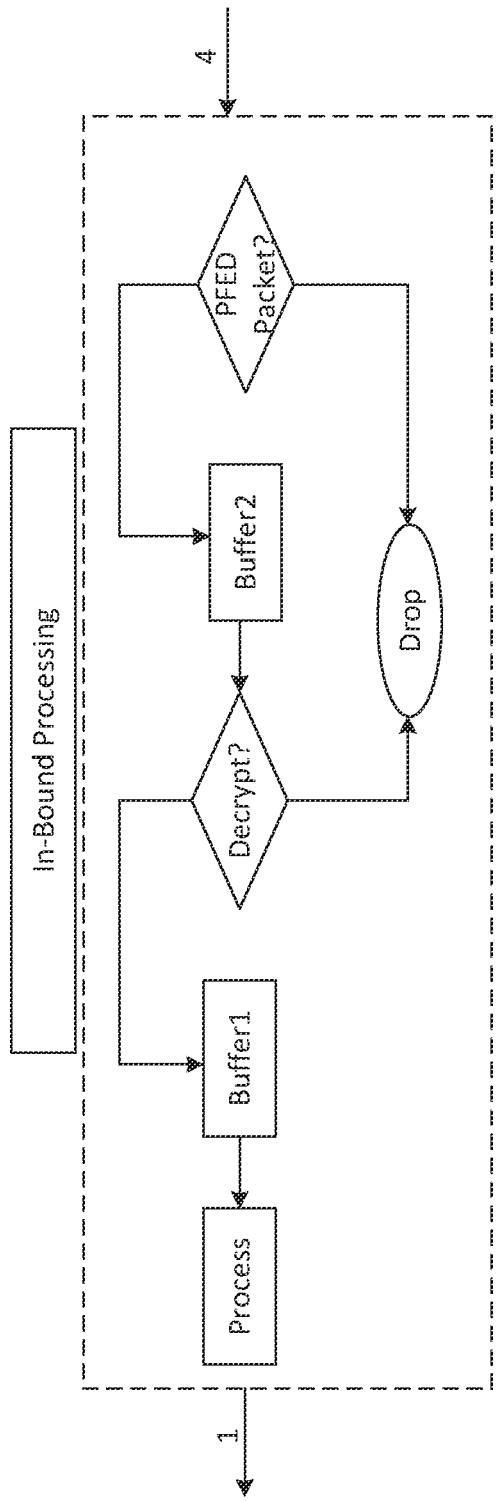
FIG. 21 is a flow diagram of an in-bound processing associated with an interface of the Isidore device 1700, in accordance with some embodiments.

FIG. 21 is a flow diagram of an in-bound processing associated with an interface of the Isidore device 1700, in accordance with some embodiments.

Figure 22:
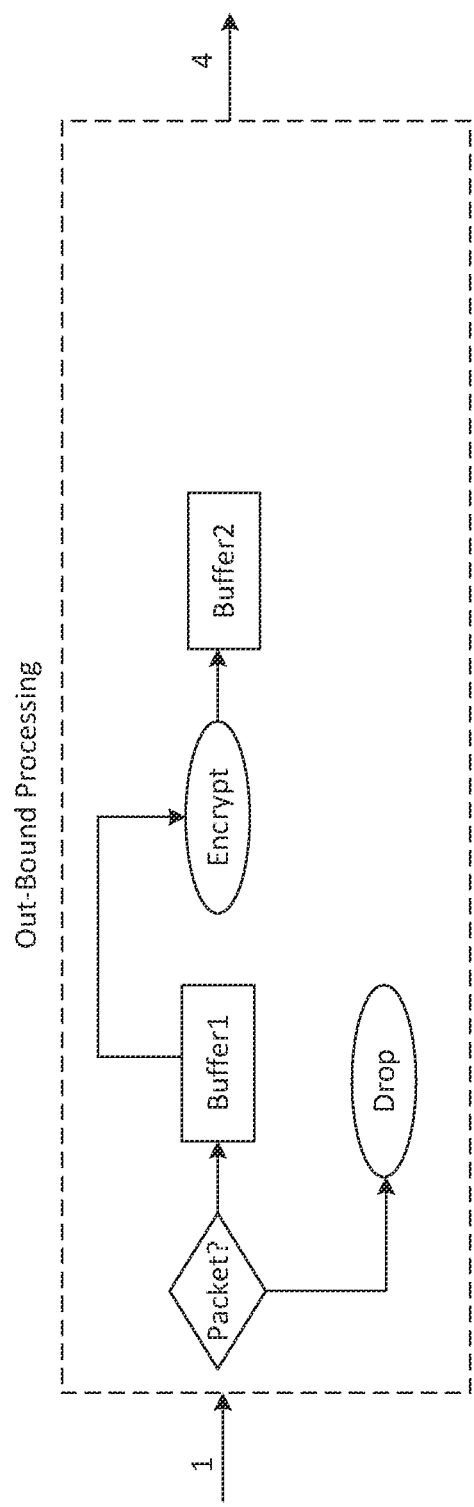
FIG. 22 is a flow diagram of an out-bound processing associated with the interface of the Isidore device 1700, in accordance with some embodiments.

FIG. 22 is a flow diagram of an out-bound processing associated with the interface of the Isidore device 1700, in accordance with some embodiments.

Figure 23:
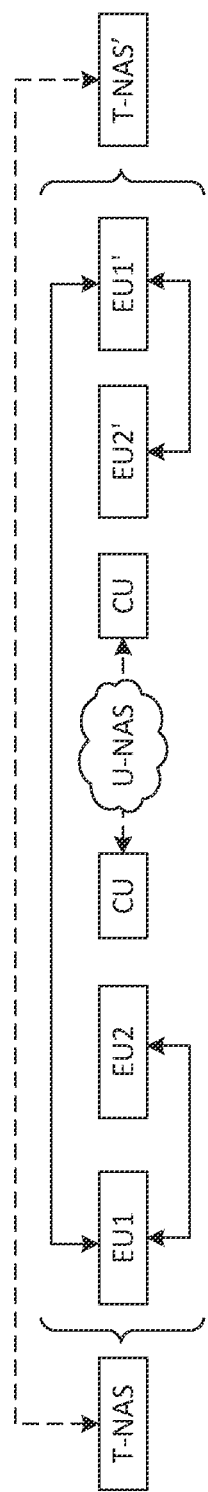
FIG. 23 illustrates a transactional control associated with the Isidore device 1700, in accordance with some embodiments.

FIG. 23 illustrates a transactional control associated with the Isidore device 1700, in accordance with some embodiments. In transactional control, EU1 is the controller of EU2. Further, the EU1 controls EU2 with transactions over the inner interconnect between EU1 and EU2. The PFED channel is managed with transactional messages between EU1 and EU1' each acting as a client or server. The T-NAS's dictates how the CU's must communicate to complete the link between PFED's.

Figure 24:
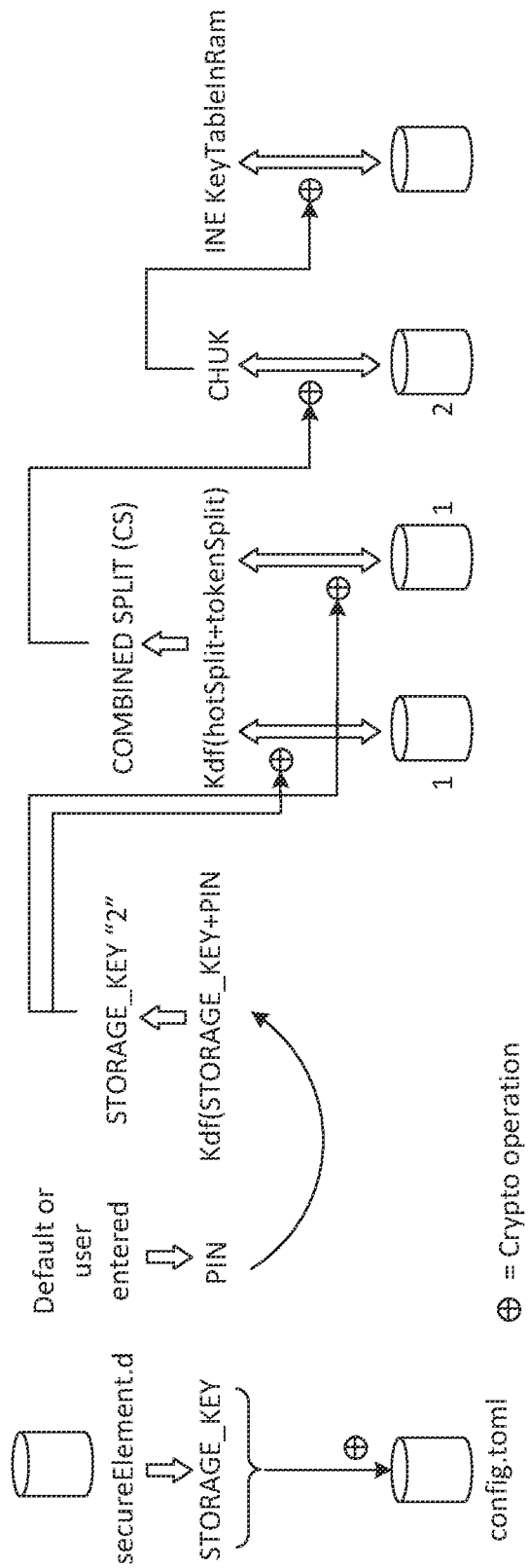
FIG. 24 illustrates a key unwrapping ceremony associated with the Isidore device 1700, in accordance with some embodiments.

FIG. 24 illustrates a key unwrapping ceremony associated with the Isidore device 1700, in accordance with some embodiments. Further, the key unwrapping ceremony may include using a real Secure Element that is a file on disk (secureElement.db). An optional PIN is entered via the USB port. The KDF of these two will produce the active STORAGE_KEY 2. All files are wrapped with this second key. A local split (split1.db) and an optional remote split (split2.db) that is retrieved by a token-INE channel (not described here) are unwrapped. The splits are combined into CS to unwrap the KEK in channelUnwrapKey.db (i.e., CHUK). CHUK then unwraps the active keys stored in channel.db into a data structure called keyTableInRAM. When successful, split2 is recomputed and CHUK is rewrapped with new CS. EU1 will ping for EU2 status and won't do anything until it gets an ACK.

Figure 25:
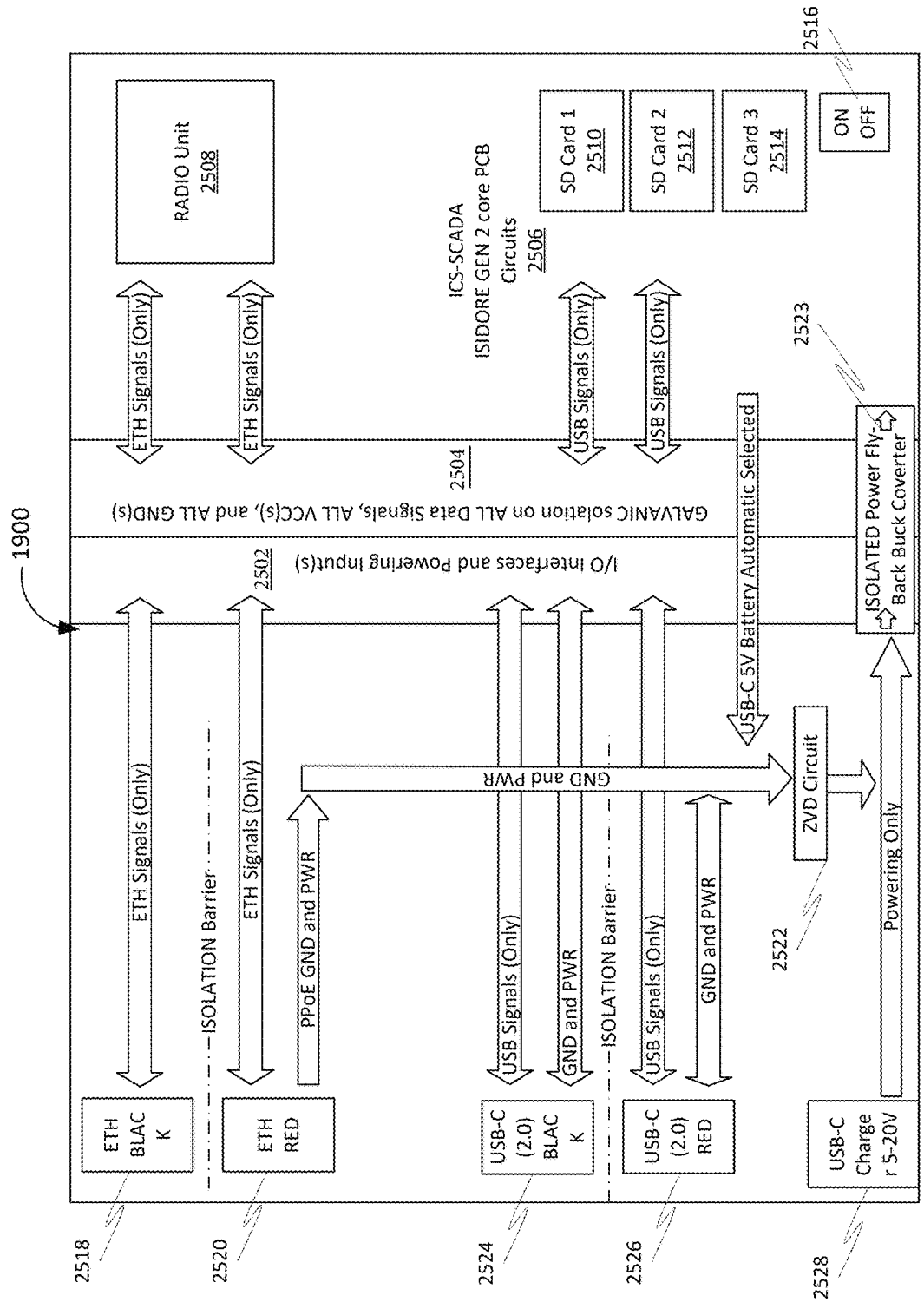
FIG. 25 is a schematic diagram of an Isidore device 2500 for providing resiliency against attack, in accordance with some embodiments.

FIG. 25 is a schematic diagram of an Isidore device 2500 for providing resiliency against attack, in accordance with some embodiments. Further, the Isidore device 2500 may include I/O interfaces and powering input(s) 2502, a galvanic isolator 2504, and a PCB circuit. Further, the PCB circuit may include a radio unit 2508, a first SD card 2510, a second SD card 2512, a third SD card 2514, and an On/Off switch 2516. Further, a first (black) Ethernet connector 2518 sends ethernet signals to the I/O interfaces and powering input(s) 2502. Further, a second (red) Ethernet connector 2520 sends ethernet signals to the I/O interfaces and powering input(s) 2502 and PPOE ground and power signal via a ZVD circuit 2522 to an isolated power fly-back buck converter 2524 for powering the PCB circuit. Further, the first Ethernet connector 2518 and the second Ethernet connector 2520 have an isolation barrier between the first Ethernet connector 2518 and the second Ethernet connector 2520. Further, a first (black) USB-C connector 2524 sends USB signals and ground and power signals to the I/O interfaces and powering input(s) 2502. Further, a second (red) USB-C connector 2526 sends USB signals to the I/O interfaces and powering input(s) 2502 and ground and power signals via the ZVD circuit 2522 to the isolated power fly-back buck converter 2523 for powering the PCB circuit 2506. Further, the first USB-C connector 2524, and the second USB-C connector 2526 have an isolation barrier between the first USB-C connector 2524 and the second USB-C connector 2526. Further, a USB-C charger 2528 is connected to the isolated power fly-back buck converter 2523 for powering the PCB circuit 2506. Further, the I/O interfaces and powering input(s) 2502 may be connected with the galvanic isolator 2504. Further, the galvanic isolator 2504 only allows the ethernet signals from the first (black) Ethernet connector 2518, the ethernet signals from the second (red) Ethernet connector 2520, the USB signals from the first (black) USB-C connector, the USB signals from the second (red) USB-C connector. Further, the PCB circuit 2506 allows for an automatic selection of a USB-C 5V battery. Further, the galvanic isolator 2504 provides galvanic isolation on all data signals (Ethernet signals and USB signals), all Vcc(s) (power signals), and all GND(s) (ground signals).

Figure 26:
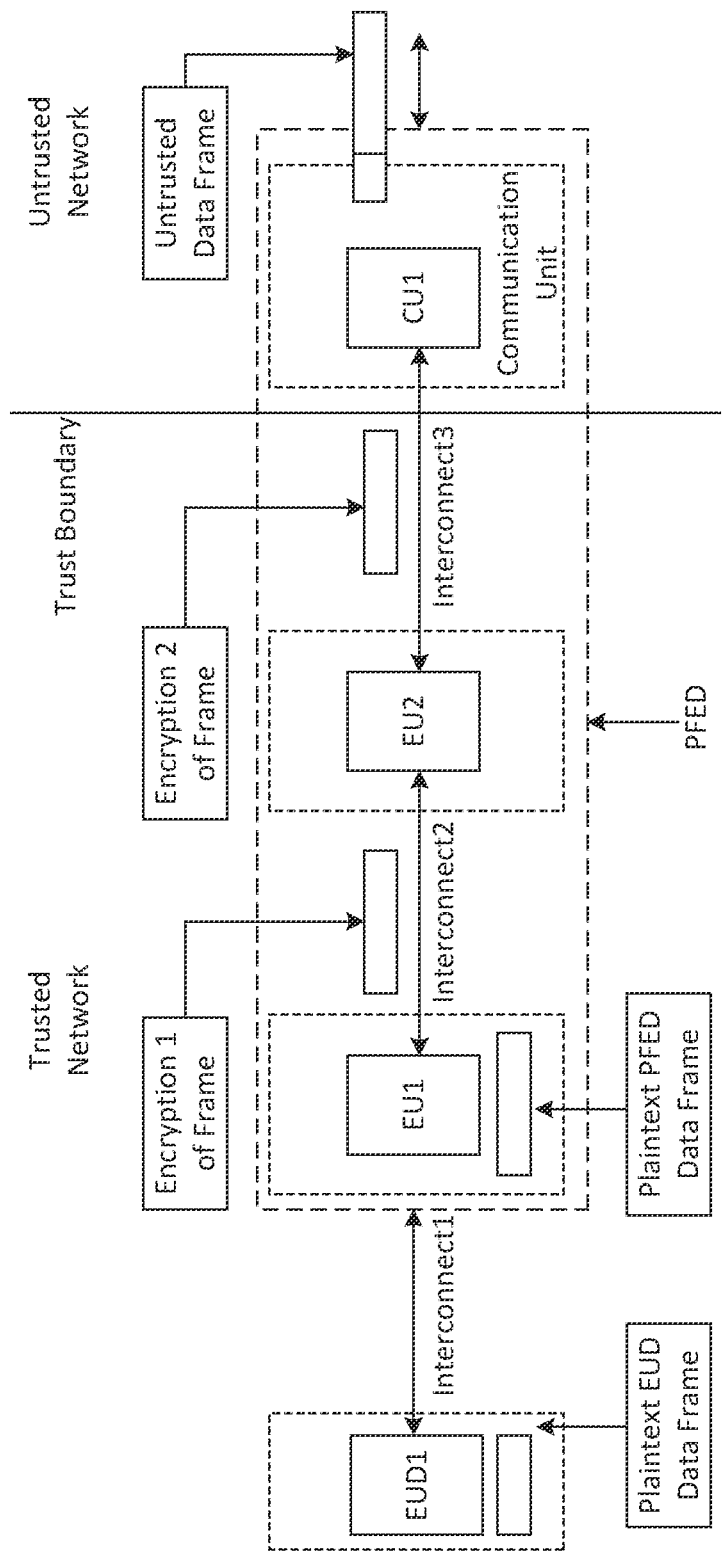
FIG. 26 illustrates an encryption methodology associated with a protocol free encryption device of an Isidore device for providing resiliency against attack, in accordance with some embodiments.

FIG. 26 illustrates an encryption methodology associated with a protocol free encryption device of an Isidore device for providing resiliency against attack, in accordance with some embodiments.

Figure 27:
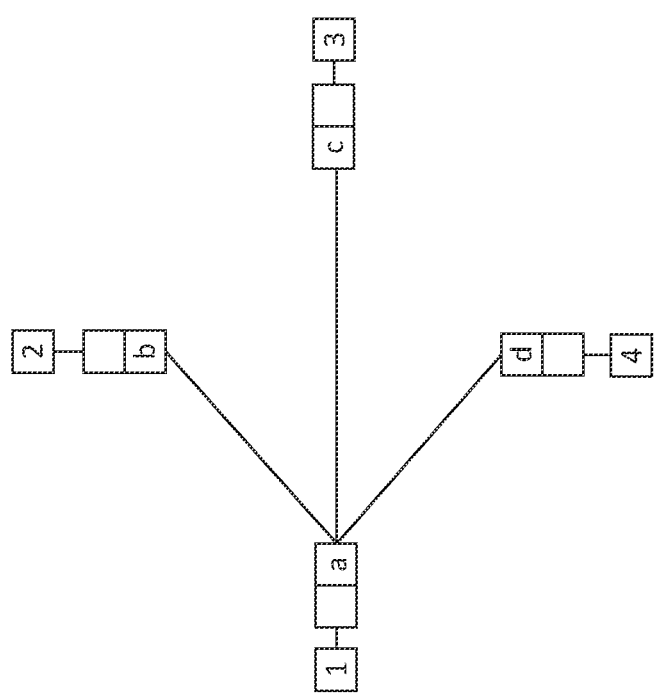
FIG. 27 illustrates an implementation of Isidore devices in a hub and spoke topology, in accordance with some embodiments.

FIG. 27 illustrates an implementation of Isidore devices in a hub and spoke topology, in accordance with some embodiments.

Figure 28:
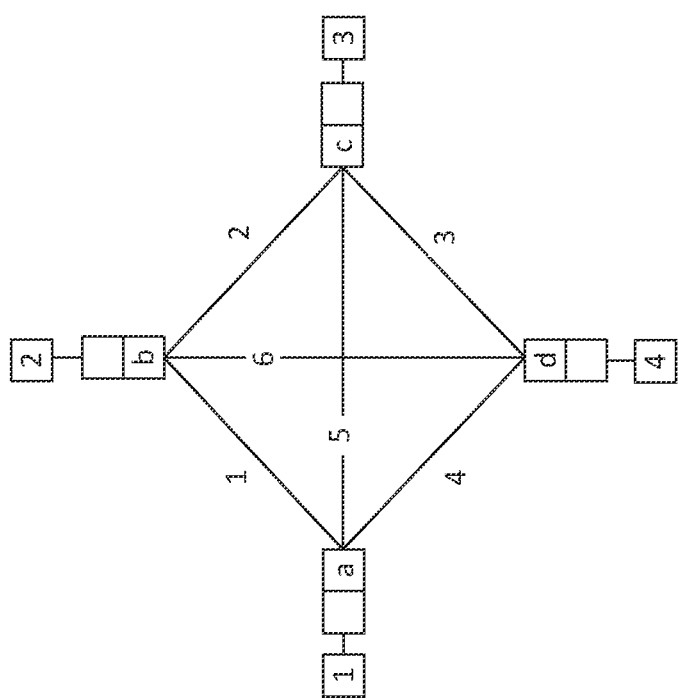
FIG. 28 illustrates an implementation of Isidore devices in a mesh topology, in accordance with some embodiments.

FIG. 28 illustrates an implementation of Isidore devices in a mesh topology, in accordance with some embodiments.

Figure 29:
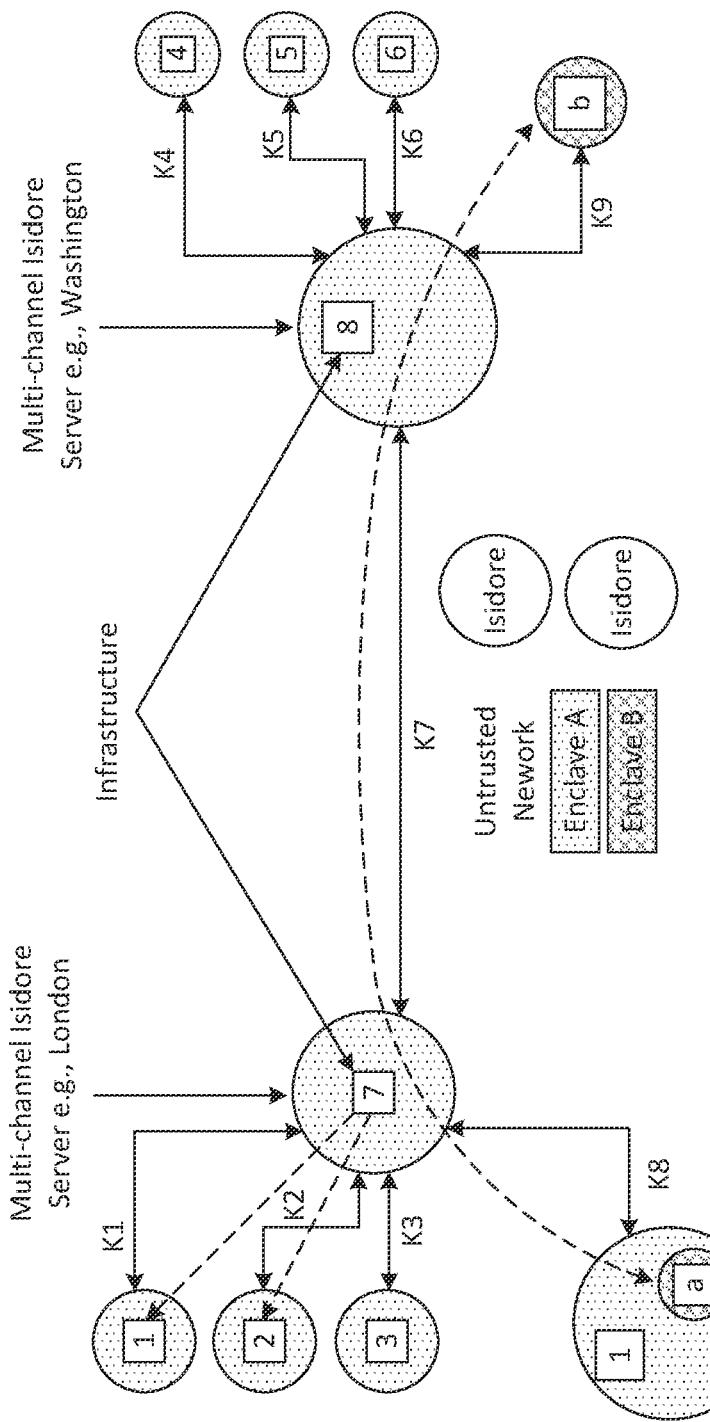
FIG. 29 illustrates a distributed network of Isidore devices with Isidore links Zero Trust Isolation Enclave within an Enclave, in accordance with some embodiments.

FIG. 29 illustrates a distributed network of Isidore devices with Isidore links Zero Trust Isolation Enclave within an Enclave, in accordance with some embodiments.

Figure 30:
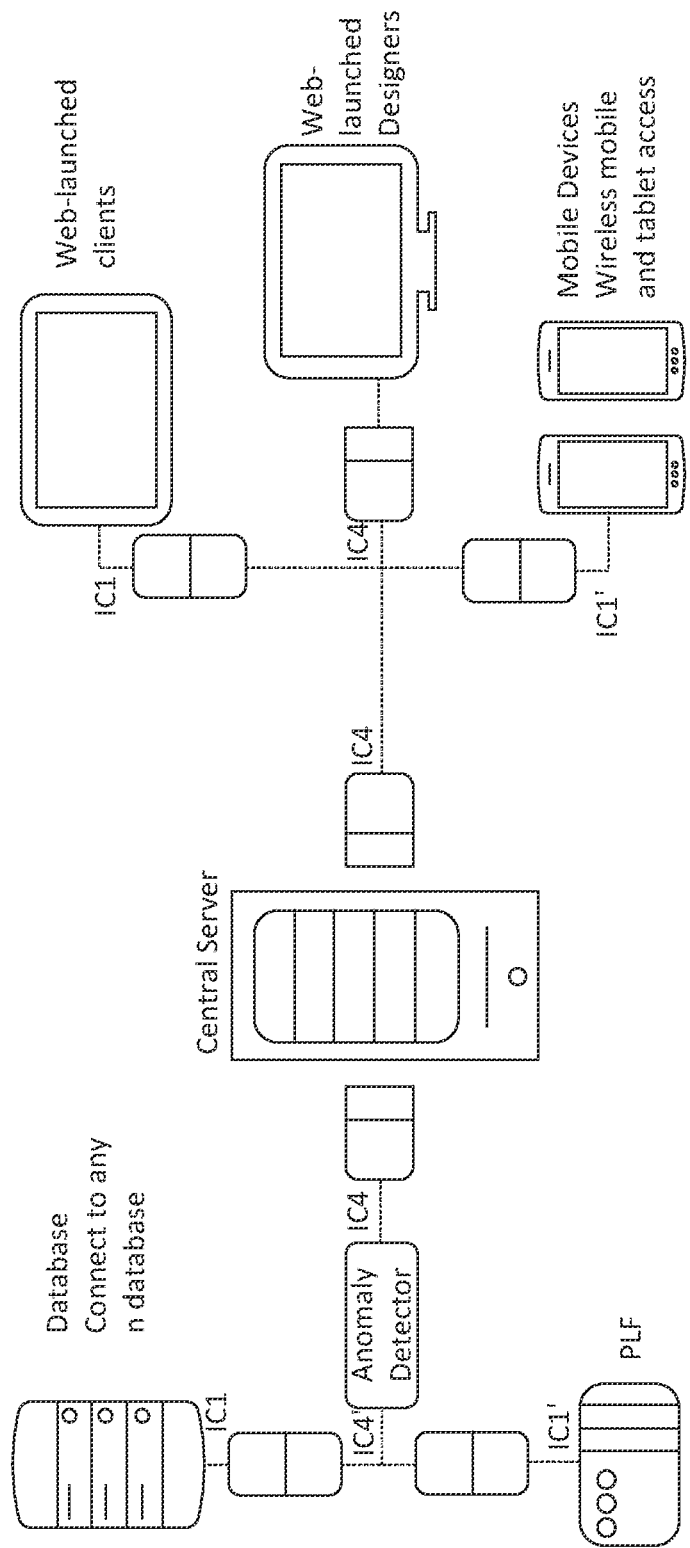
FIG. 30 illustrates an implementation of Isidore devices for operations in ICS/SCADA, in accordance with some embodiments.

FIG. 30 illustrates an implementation of Isidore devices for operations in ICS/SCADA, in accordance with some embodiments.

Figure 31:
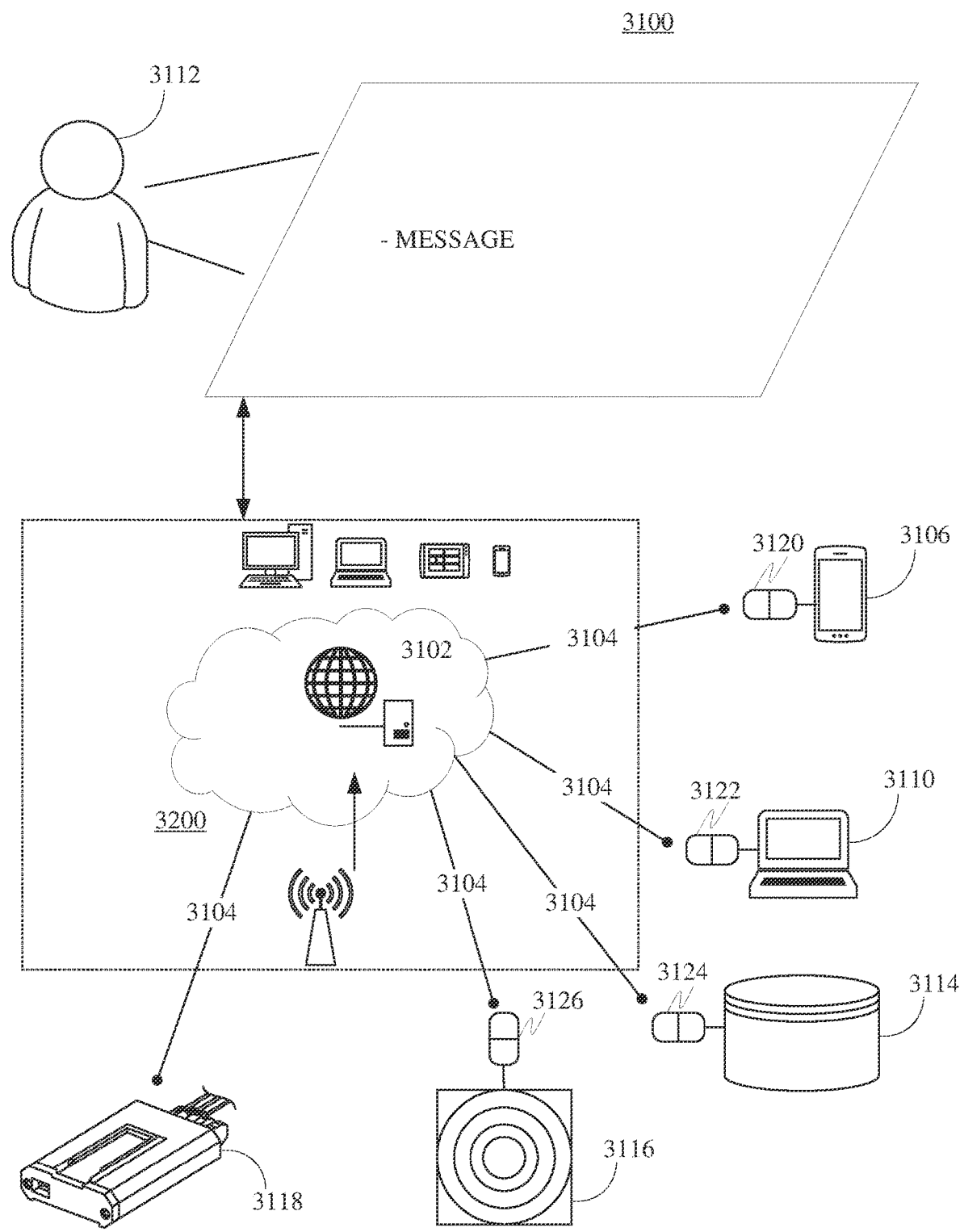
FIG. 31 is an illustration of an online platform consistent with various embodiments of the present disclosure.

FIG. 31 is an illustration of an online platform 3100 consistent with various embodiments of the present disclosure. By way of non-limiting example, the online platform 3100 to provide resiliency against attack using an encryption retransmission device may be hosted on a centralized server 3102, such as, for example, a cloud computing service. The centralized server 3102 may communicate with other network entities, such as, for example, a mobile device 3106 (such as a smartphone, a laptop, a tablet computer, etc.), other electronic devices 3110 (such as desktop computers, server computers, etc.), databases 3114, sensors 3116, and an apparatus 3118 (an encryption retransmission device) over a communication network 3104, such as, but not limited to, the Internet. Further, the mobile device 3116 may be connected with a first encryption retransmission device 3120, the electronic device 3110 may be connected with a second encryption retransmission device 3122, the databases 3114 may be connected with a third encryption retransmission device 3124, the sensors 3116 may be connected with a fourth encryption retransmission device 3124. Further, the network entities may communicate with each other using an encryption retransmission device connected with each network entity. Further, users of the online platform 3100 may include relevant parties such as, but not limited to, end-users, administrators, service providers, service consumers, and so on. Accordingly, in some instances, electronic devices operated by the one or more relevant parties may be in communication with the platform.

A user 3112, such as the one or more relevant parties, may access online platform 3100 through a web-based software application or browser. The web-based software application may be embodied as, for example, but not be limited to, a website, a web application, a desktop application, and a mobile application compatible with a computing device 3200.

Figure 32:
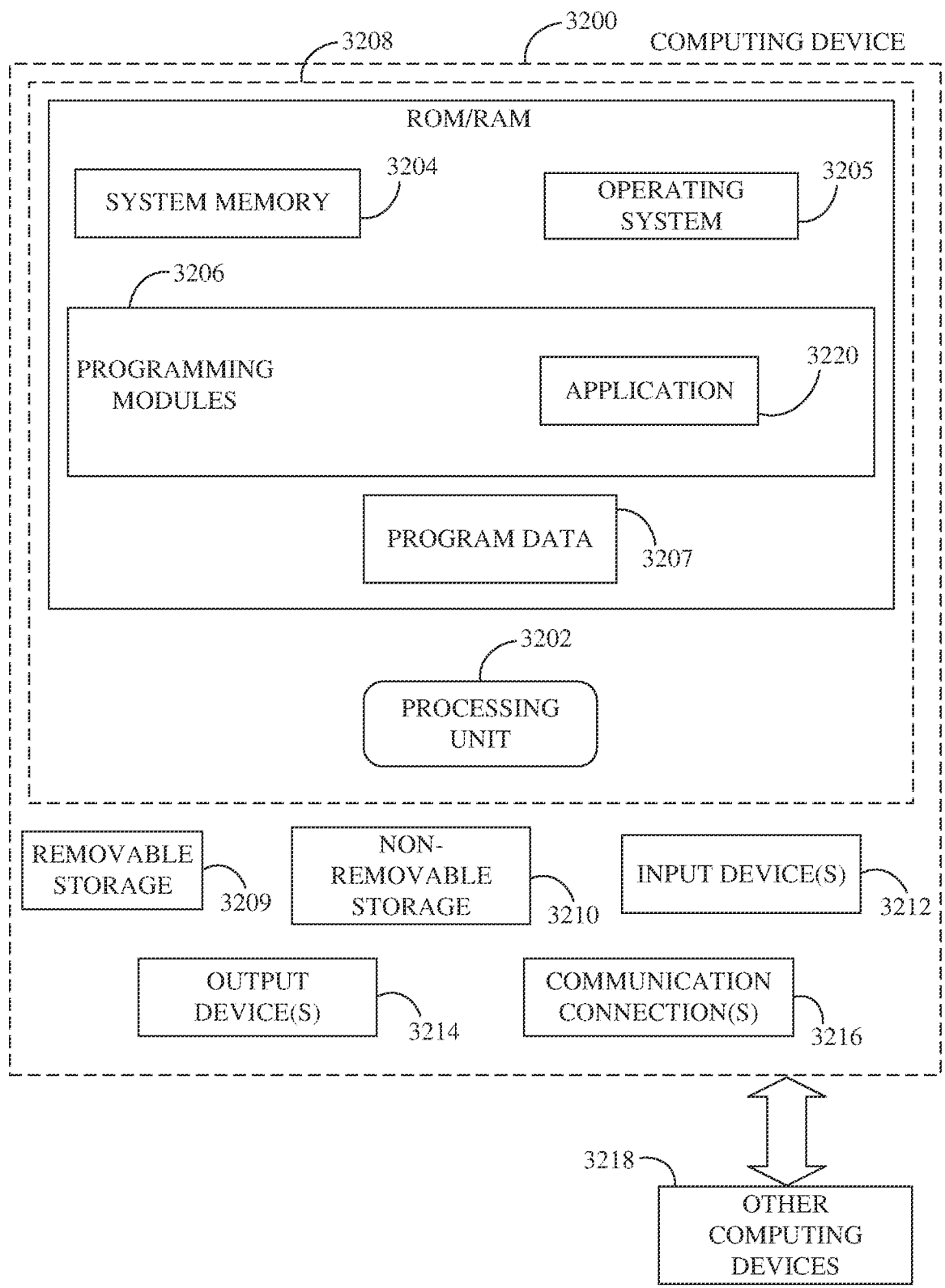
FIG. 32 is a block diagram of a computing device for implementing the methods disclosed herein, in accordance with some embodiments.

With reference to FIG. 32, a system consistent with an embodiment of the disclosure may include a computing device or cloud service, such as computing device 3200. In a basic configuration, computing device 3200 may include at least one processing unit 3202 and a system memory 3204. Depending on the configuration and type of computing device, system memory 3204 may comprise, but is not limited to, volatile (e.g., random-access memory (RAM)), non-volatile (e.g., read-only memory (ROM)), flash memory, or any combination. System memory 3204 may include operating system 3205, one or more programming modules 3206, and may include a program data 3207. Operating system 3205, for example, may be suitable for controlling computing device 3200's operation. In one embodiment, programming modules 3206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 32 by those components within a dashed line 3208.

Computing device 3200 may have additional features or functionality. For example, computing device 3200 may also include additional data storage devices (removable and/or non-removable) such as, for example, magnetic disks, optical disks, or tape. Such additional storage is illustrated in FIG. 32 by a removable storage 3209 and a non-removable storage 3210. Computer storage media may include volatile and non-volatile, removable and non-removable media implemented in any method or technology for storage of information, such as computer-readable instructions, data structures, program modules, or other data. System memory 3204, removable storage 3209, and non-removable storage 3210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3200. Any such computer storage media may be part of device 3200. Computing device 3200 may also have input device(s) 3212 such as a keyboard, a mouse, a pen, a sound input device, a touch input device, a location sensor, a camera, a biometric sensor, etc. Output device(s) 3214 such as a display, speakers, a printer, etc. may also be included. The aforementioned devices are examples and others may be used.

Computing device 3200 may also contain a communication connection 3216 that may allow device 3200 to communicate with other computing devices 3218, such as over a network in a distributed computing environment, for example, an intranet or the Internet. Communication connection 3216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3204, including operating system 3205. While executing on processing unit 3202, programming modules 3206 (e.g., application 3220 such as a media player) may perform processes including, for example, one or more stages of methods, algorithms, systems, applications, servers, databases as described above. The aforementioned process is an example, and processing unit 3202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An encryption retransmission device for providing resiliency against attacks, the encryption retransmission device comprising:
    at least one encryption unit configured for:
        encrypting an egressing native packet received from at least one device using at least one encryption key to create an encrypted egressing native packet;
        adding a connectionless header to the encrypted egressing native packet to form an egressing connectionless datagram;
        receiving an ingressing connectionless datagram comprising an ingressing encrypted native packet; and
        decrypting the encrypted ingressing native packet using the at least one encryption key;
    at least one communication unit communicatively coupled with the at least one encryption unit, wherein the at least one communication unit is paired with at least one first communication unit of at least one first encryption retransmission device, wherein the at least one communication unit is configured for:
        receiving the egressing connectionless datagram;
        adding a complex header to the egressing connectionless datagram for forming an egressing packet for delivery to the at least one first encryption retransmission device;
        receiving an ingressing packet comprising the encrypted ingressing native packet and a complex header from the at least one first encryption retransmission device;
        removing the complex header from the ingressing packet; and
        adding a connectionless header to the ingressing packet for forming an ingressing connectionless datagram, wherein the ingressing connectionless datagram comprises the encrypted ingressing native packet; and
    at least one galvanic isolator electromagnetically coupled with the at least one encryption unit and the at least one communication unit, wherein the at least one galvanic isolator is configured for galvanically isolating the at least one encryption unit and the at least one communication unit.

2. The encryption retransmission device of claim 1 further comprising at least one interface module communicatively coupled with at least one of the at least one encryption unit and the at least one communication unit, wherein the at least one interface module comprises a plurality of interfaces.

3. The encryption retransmission device of claim 2, wherein the plurality of interfaces comprises at least one first interface, wherein the egressing native packet received at the at least one first interface from the at least one device.

4. The encryption retransmission device of claim 2, wherein the plurality of interfaces further comprises at least one second interface, wherein the receiving of the ingressing connectionless datagram comprising the ingressing encrypted native packet comprising receiving the ingressing connectionless datagram comprising the ingressing encrypted native packet at the at least one second interface.

5. The encryption retransmission device of claim 2, wherein the at least one interface module is communicatively coupled with the at least one communication unit, wherein the at least one communication unit of the encryption retransmission device is paired to the at least one communication unit of the at least one first encryption retransmission device via the at least one interface module.

6. The encryption retransmission device of claim 2, wherein the at least one interface module is electromagnetically coupled with at least one of the at least one encryption unit and the at least one communication unit via the at least one galvanic isolator.

7. The encryption retransmission device of claim 2, wherein the plurality of interfaces further comprises at least one third interface, wherein the at least one third interface manages the at least one communication unit.

8. The encryption retransmission device of claim 1 further comprising a power input interface electromagnetically coupled to the at least one communication unit and the at least one encryption unit via the at least one galvanic isolator, wherein the power input interface is configured for receiving power from at least one external power source for powering the at least one encryption unit and the at least one communication unit.

9. The encryption retransmission device of claim 1 further comprising a resin enclosure comprised of at least one resin, wherein the resin enclosure encloses the encryption retransmission device.

10. The encryption retransmission device of claim 1 further comprising an inner enclosure enclosing the encryption retransmission device, wherein the inner enclosure is comprised of at least one metal, wherein the inner enclosure forms a Faraday cage around the encryption retransmission device.

11. The encryption retransmission device of claim 10 further comprising an outer enclosure disposed around the inner enclosure, wherein the outer enclosure is comprised of at least one material.

12. The encryption retransmission device of claim 1 further comprising at least one power source electrically coupled with the at least one encryption unit and the at least one communication unit, wherein the at least one power source is configured for powering the at least one encryption unit and the at least one communication unit for at least one time period.

13. The encryption retransmission device of claim 1, wherein the at least one first encryption retransmission device comprises:
   at least one first encryption unit configured for:
      encrypting an egressing native packet received from at least one second device using at least one encryption key to create an encrypted egressing native packet;
      adding a connectionless header to the encrypted egressing native packet to form an egressing connectionless datagram;
      receiving an ingressing connectionless datagram comprising an ingressing encrypted native packet; and
      decrypting the encrypted ingressing native packet using the at least one encryption key;
   the at least one first communication unit paired with the at least one communication unit of the encryption retransmission device, wherein the at least one first communication unit is configured for:
      receiving the egressing connectionless datagram;
      adding a complex header to the egressing connectionless datagram for forming an egressing packet for delivery to the encryption retransmission device;
      receiving an ingressing packet comprising the encrypted ingressing native packet and a complex header from the encryption retransmission device;
      removing the complex header from the ingressing packet; and
      adding a connectionless header to the ingressing packet for forming an ingressing connectionless datagram, wherein the ingressing connectionless datagram comprises the encrypted ingressing native packet; and
   at least one first galvanic isolator electromagnetically coupled with the at least one first encryption unit and the at least one first communication unit, wherein the at least one first galvanic isolator is configured for galvanically isolating the at least one first encryption unit and the at least one first communication unit.

14. The encryption retransmission device of claim 13, wherein the at least one encryption unit is configured for sending at least one message to the at least one first encryption unit.

15. The encryption retransmission device of claim 14, wherein the at least one message manages at least one cryptographic state of the at least one encryption unit and the at least one first encryption unit.

16. The encryption retransmission device of claim 14, wherein the at least one message manages at least one encryption key associated with the at least one encryption unit and the at least one first encryption unit.

17. The encryption retransmission device of claim 14, wherein the at least one message manages at least one algorithm associated with the at least one encryption unit and the at least one first encryption unit.

18. The encryption retransmission device of claim 14, wherein the at least one message manages at least one status associated with the at least one encryption unit and the at least one first encryption unit.

19. The encryption retransmission device of claim 1, wherein the at least one encryption unit is communicatively coupled to the at least one communication via a one-way connection for providing at least one instruction to the at least one communication unit.

20. The encryption retransmission device of claim 1 further comprising at least one anomaly detector electromagnetically coupled to at least one of the at least one encryption unit and the at least one communication unit via the at least one galvanic isolator and the at least one device, wherein the at least one anomaly detector is configured for:
   analyzing at least one signal associated with at least one of the at least one encryption unit and the at least one communication unit and the at least one device using at least one machine learning model;
   determining an attack associated with the encryption retransmission device based on the analyzing; and
   generating an alert for the attack based on the determining of the attack.

* * * * *